Feb. 24, 1953 — H. G. ALLEN ET AL — 2,629,340

PRETZEL MACHINE

Filed Dec. 29, 1945

INVENTOR
HOWARD G. ALLEN
OWEN M. HUDSON
BY George S. Hastings
ATTORNEY

Feb. 24, 1953
H. G. ALLEN ET AL
2,629,340
PRETZEL MACHINE
Filed Dec. 29, 1945
12 Sheets-Sheet 2
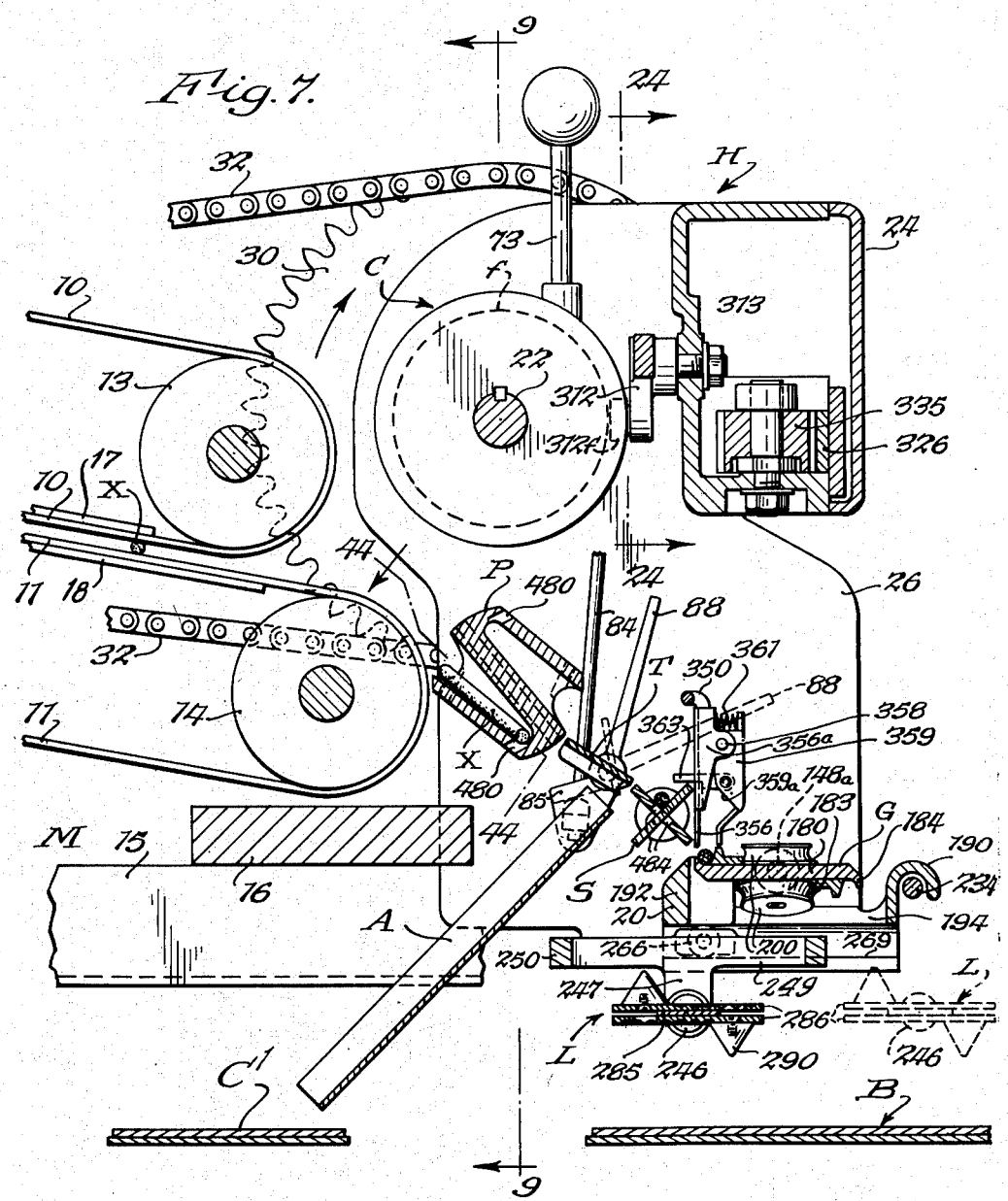
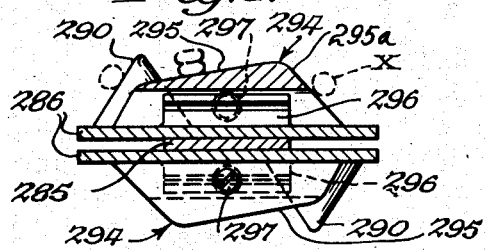
INVENTOR
HOWARD G. ALLEN
OWEN M. HUDSON
BY
George S. Hastings
ATTORNEY

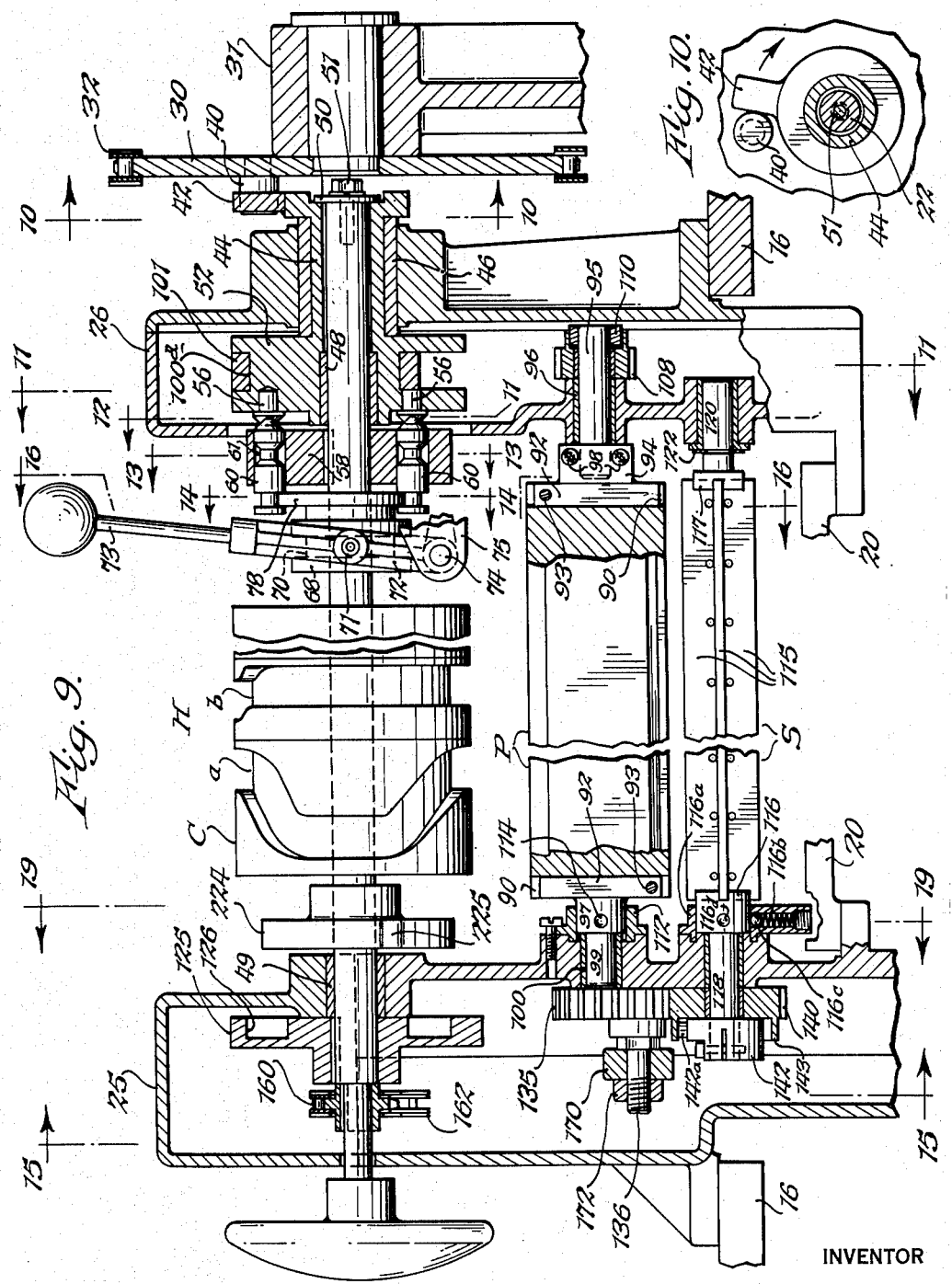

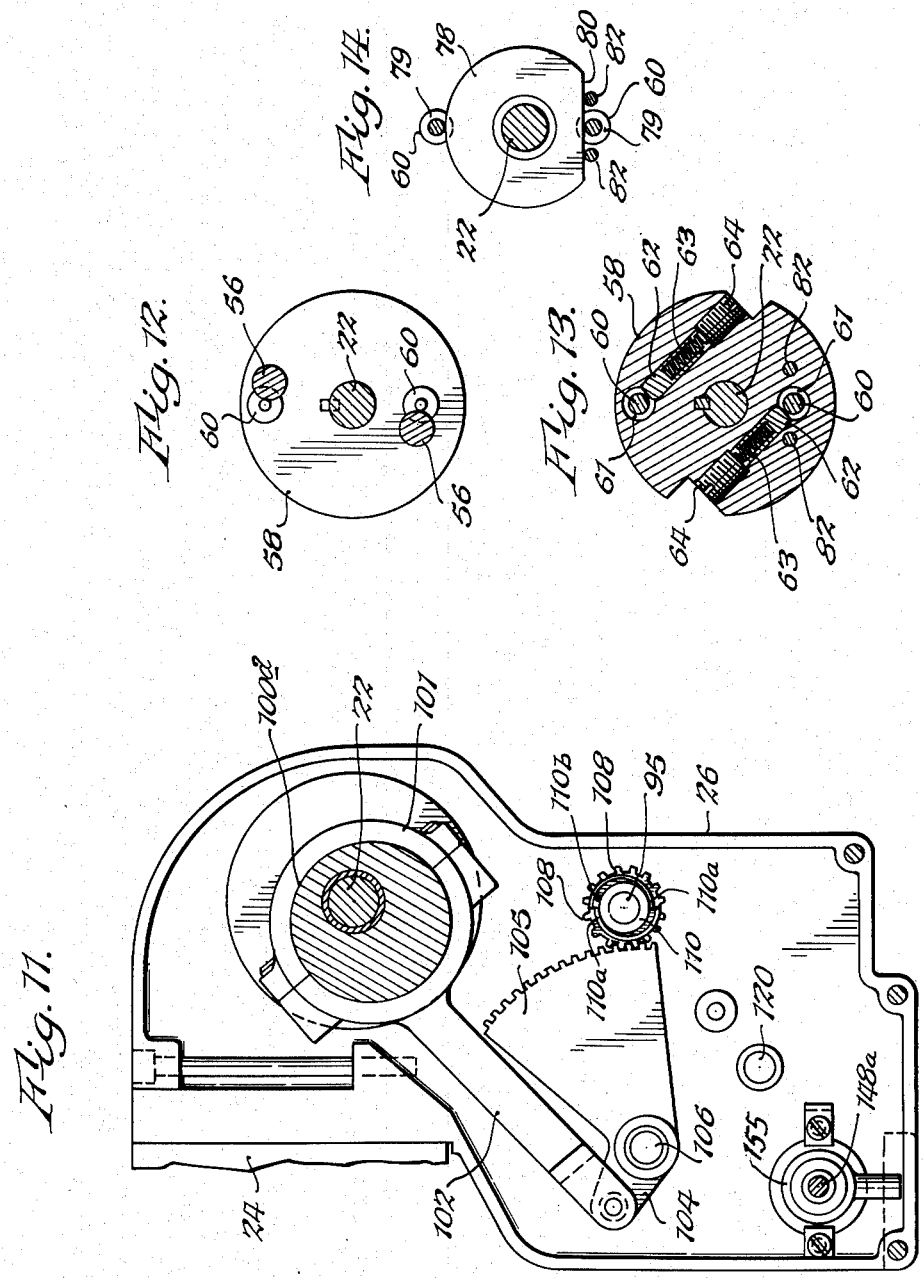

Feb. 24, 1953  H. G. ALLEN ET AL  2,629,340
PRETZEL MACHINE
Filed Dec. 29, 1945  12 Sheets-Sheet 5
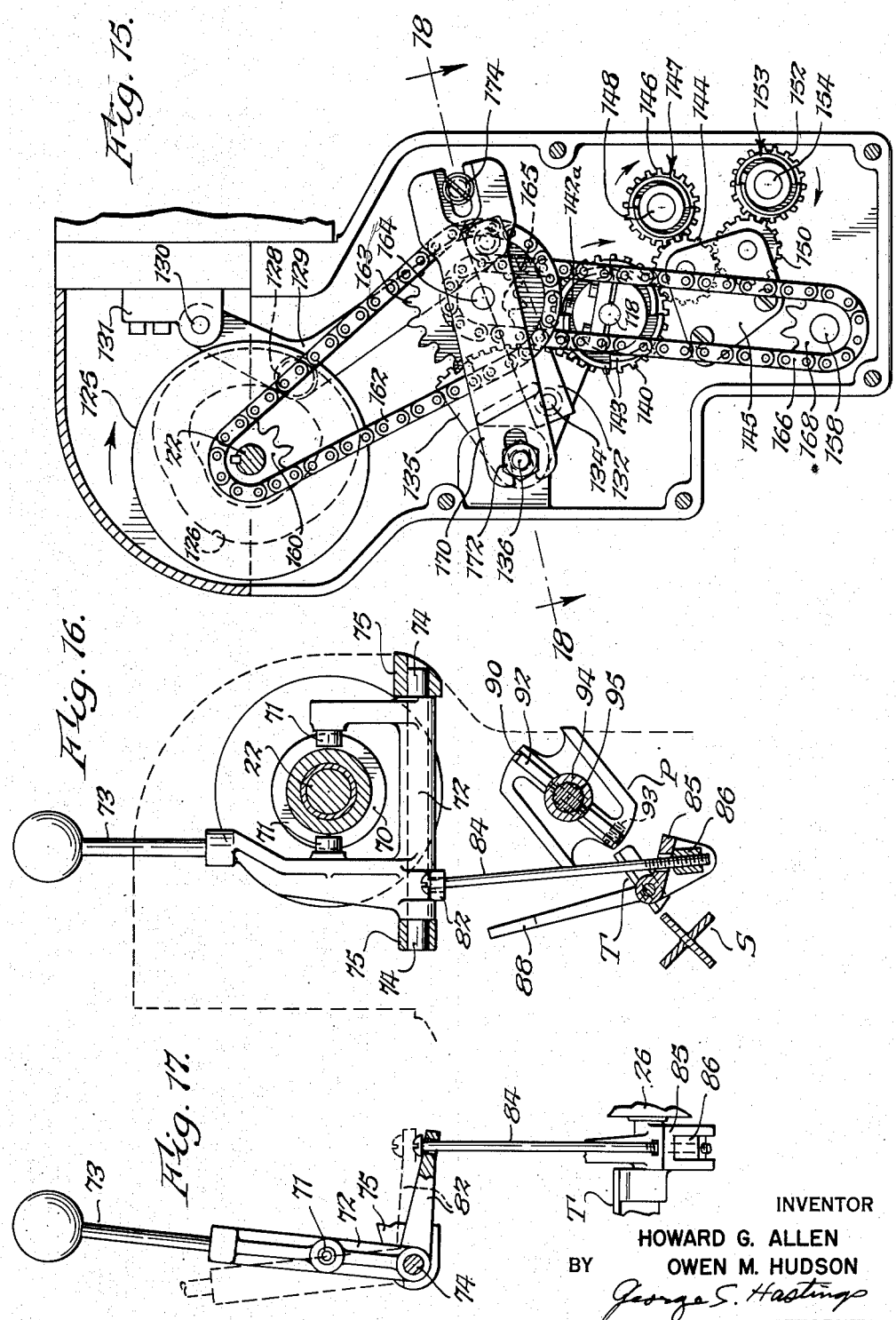
INVENTOR
HOWARD G. ALLEN
BY  OWEN M. HUDSON
George S. Hastings
ATTORNEY Feb. 24, 1953    H. G. ALLEN ET AL    2,629,340
PRETZEL MACHINE
Filed Dec. 29, 1945    12 Sheets-Sheet 6
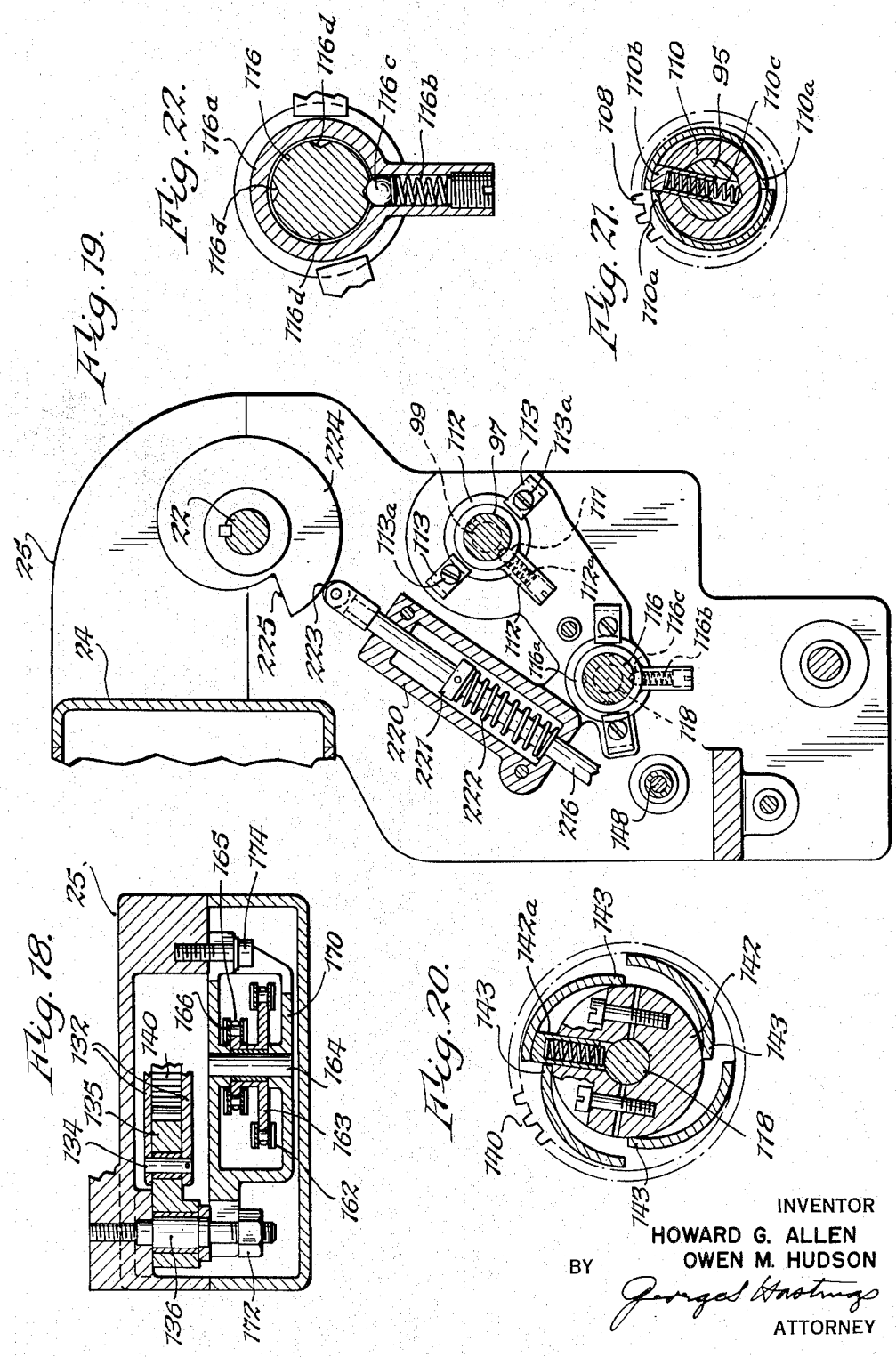
INVENTOR
HOWARD G. ALLEN
OWEN M. HUDSON
BY
George Hastings
ATTORNEY

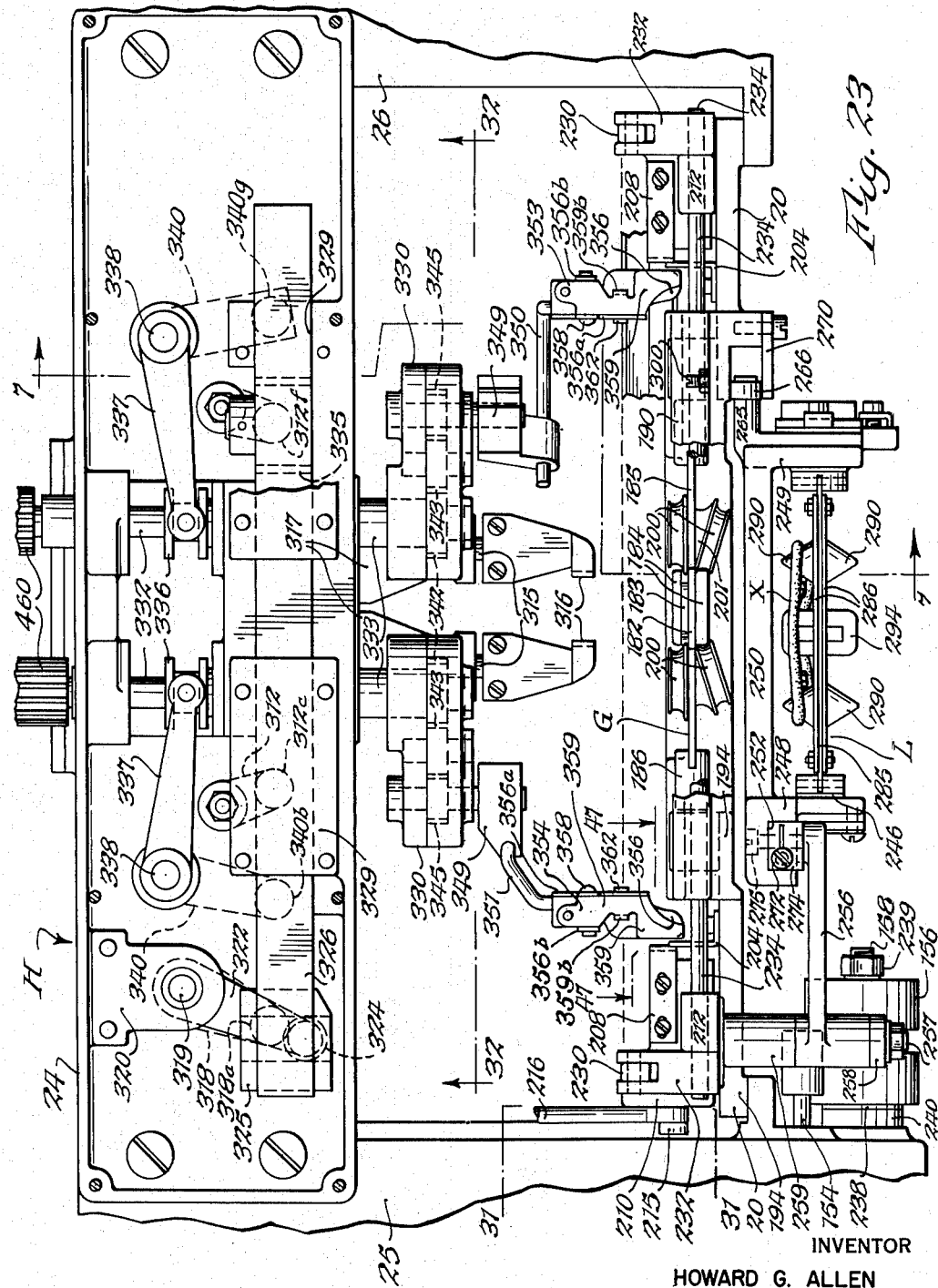

Feb. 24, 1953 H. G. ALLEN ET AL 2,629,340
PRETZEL MACHINE
Filed Dec. 29, 1945 12 Sheets-Sheet 8
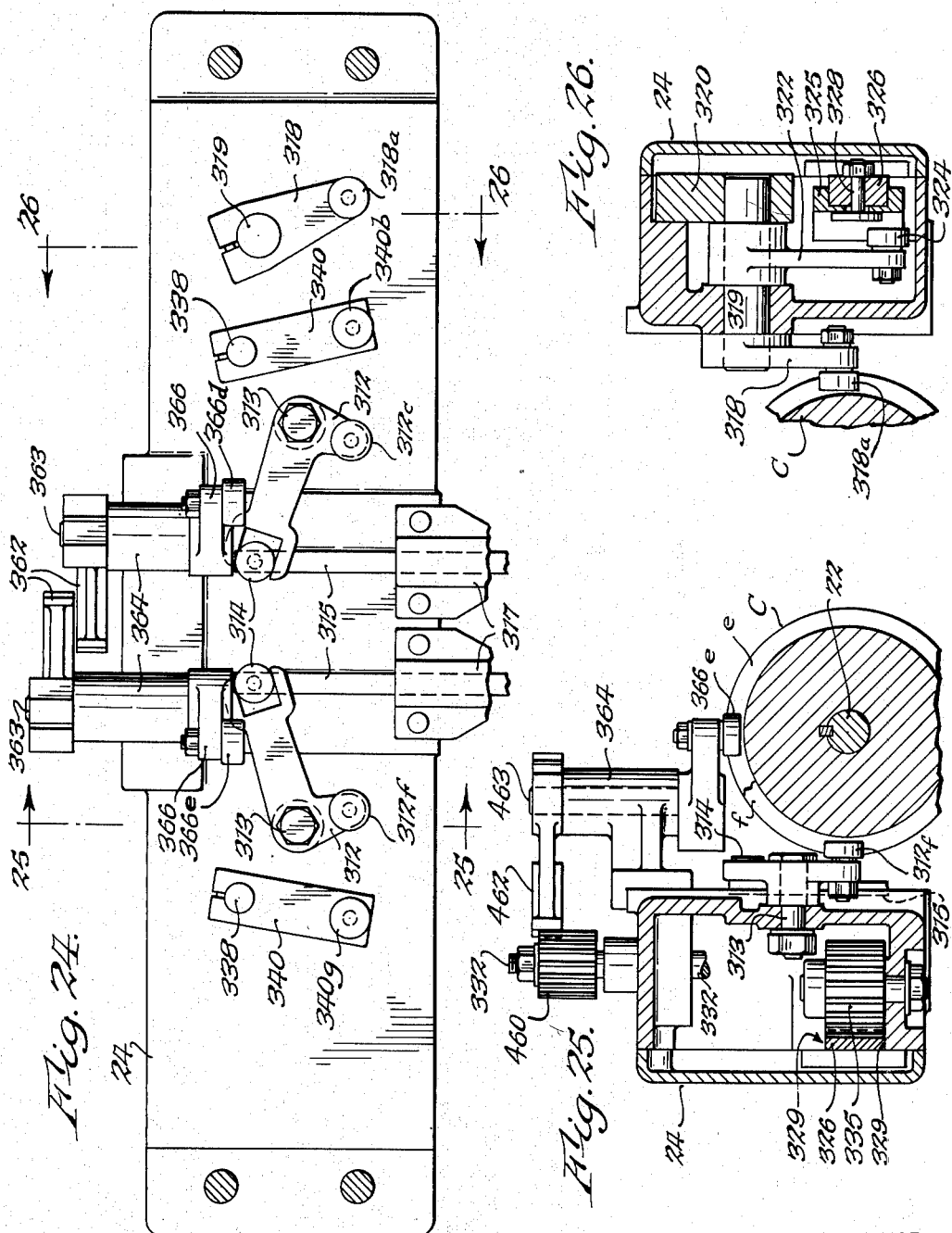
INVENTOR
HOWARD G. ALLEN
OWEN M. HUDSON
BY
George S Hastings
ATTORNEY

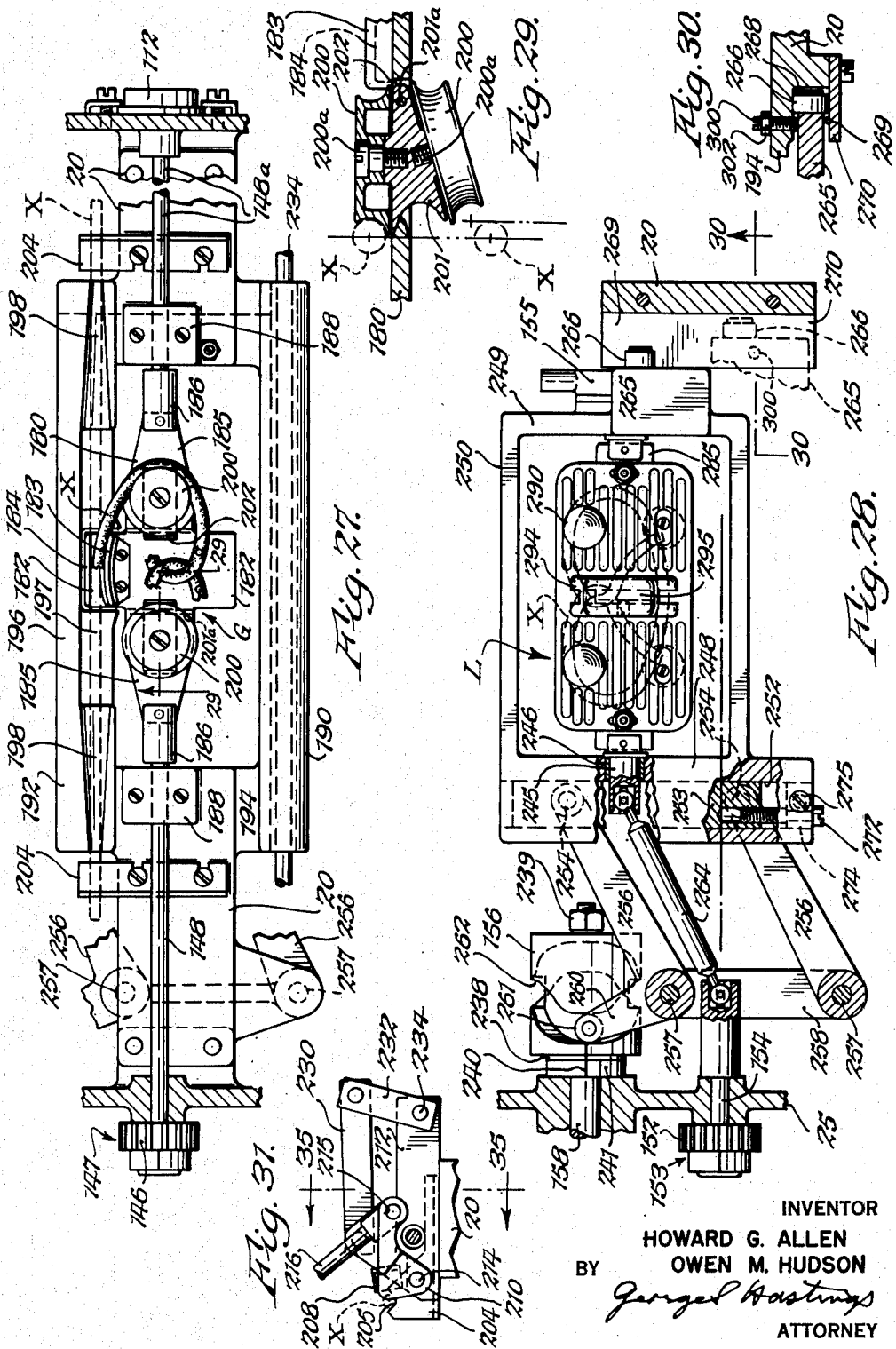

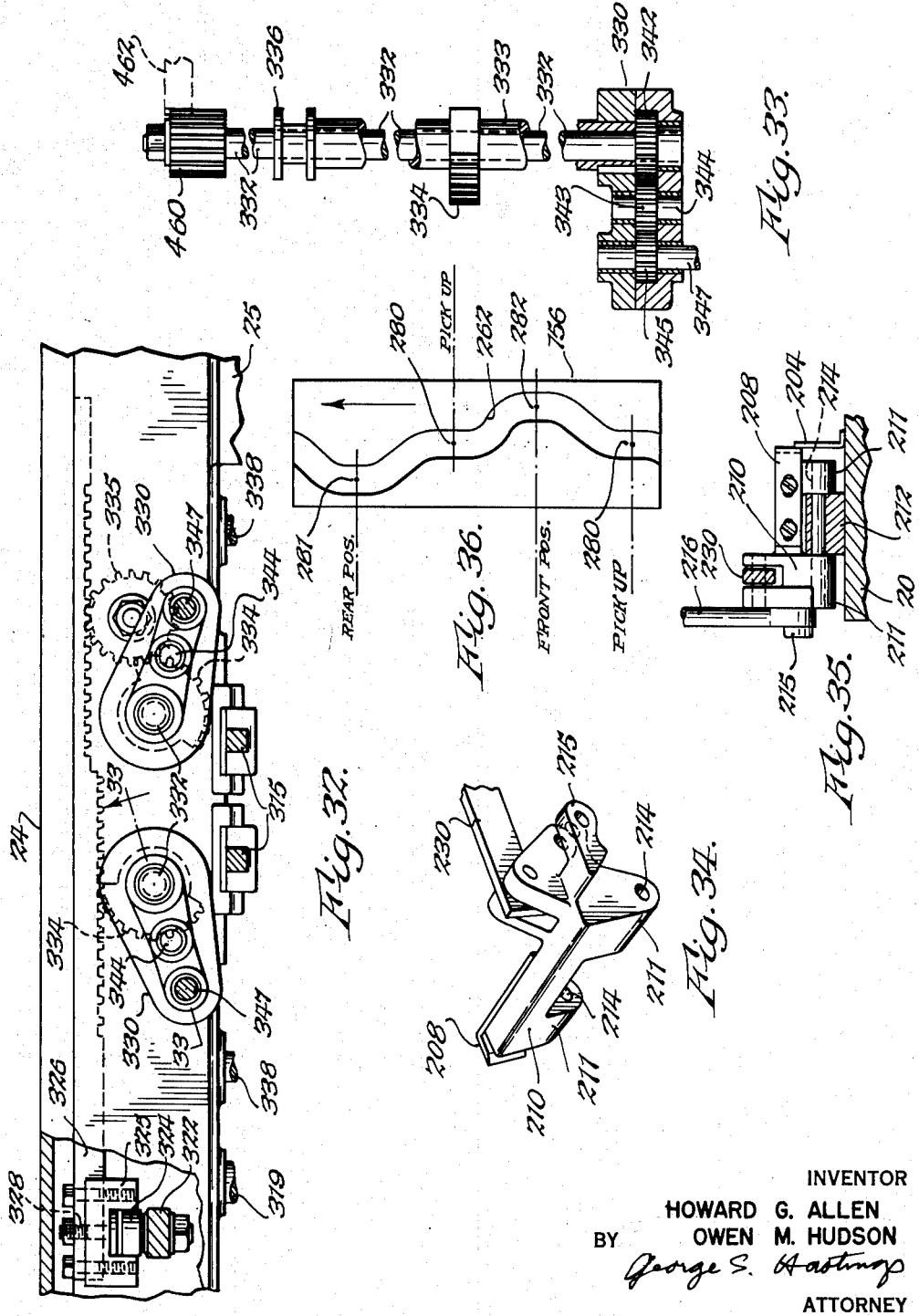

Feb. 24, 1953  H. G. ALLEN ET AL  2,629,340
PRETZEL MACHINE
Filed Dec. 29, 1945  12 Sheets-Sheet 11
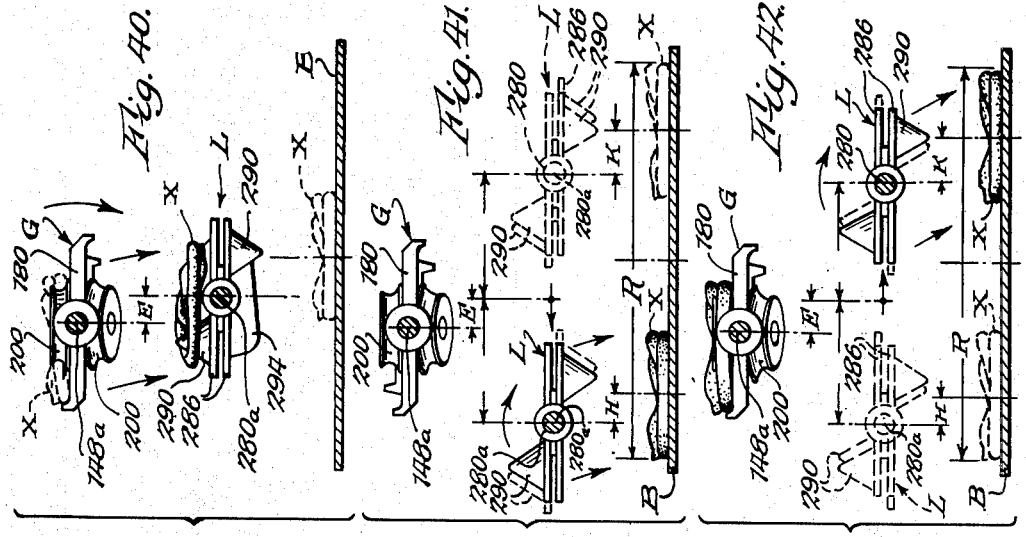
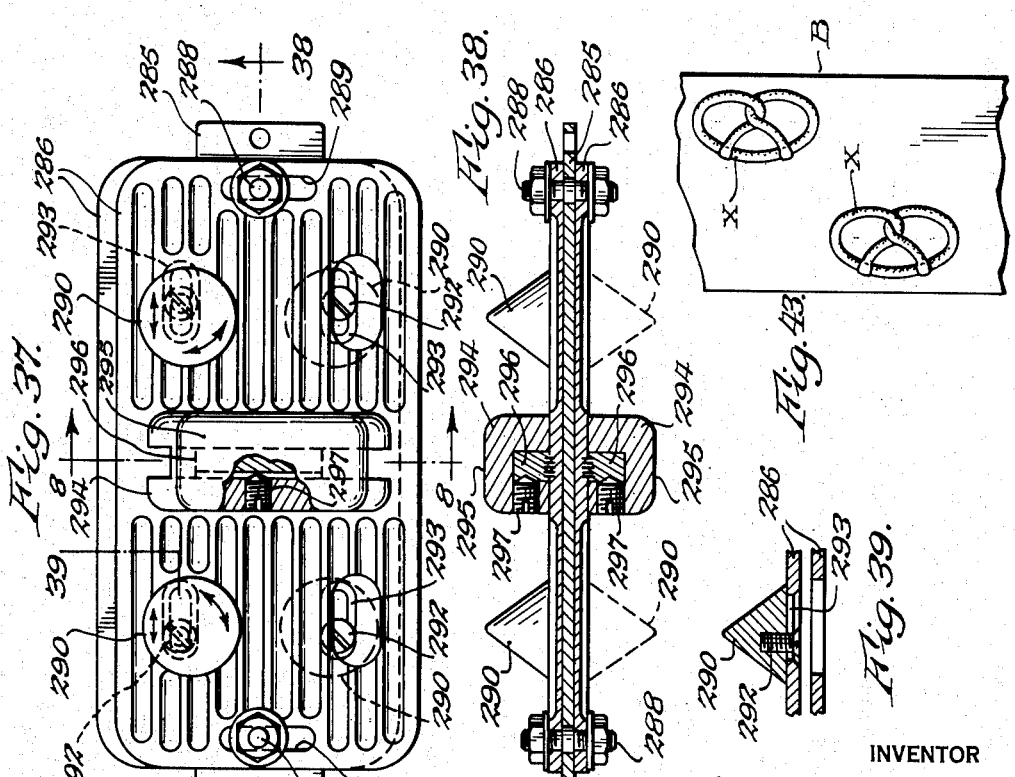
INVENTOR
HOWARD G. ALLEN
BY  OWEN M. HUDSON
George S. Hastings
ATTORNEY Feb. 24, 1953   H. G. ALLEN ET AL   2,629,340
PRETZEL MACHINE
Filed Dec. 29, 1945   12 Sheets-Sheet 12
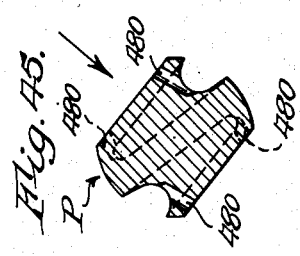
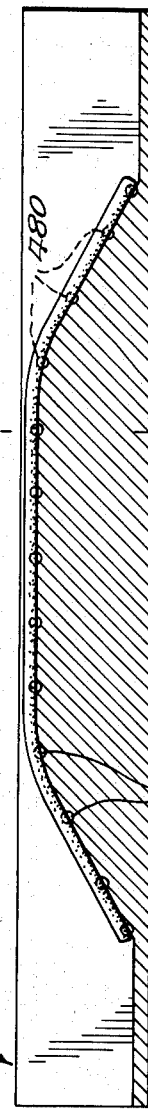
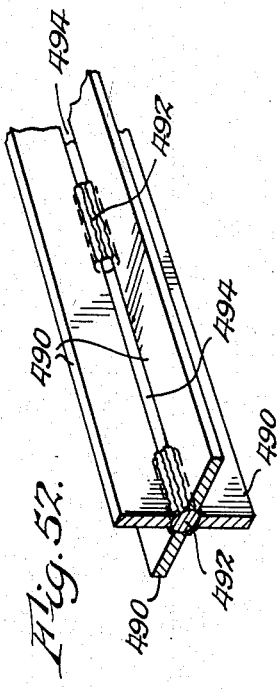
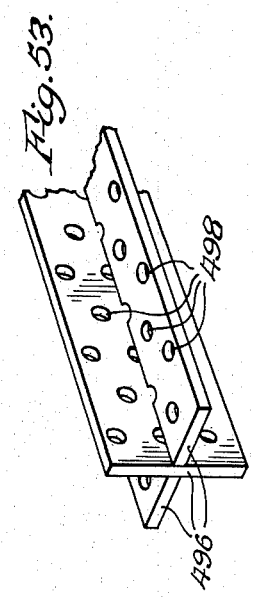
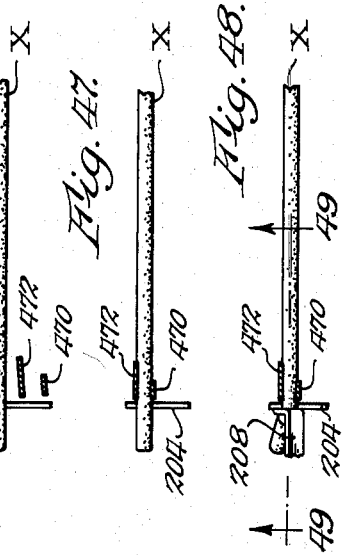
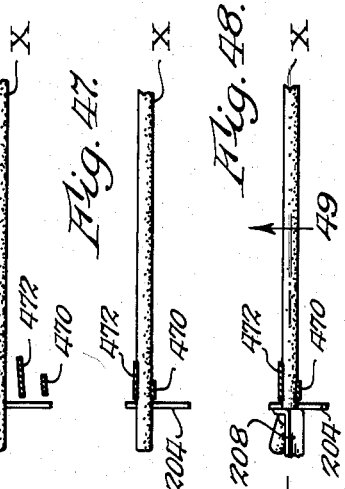
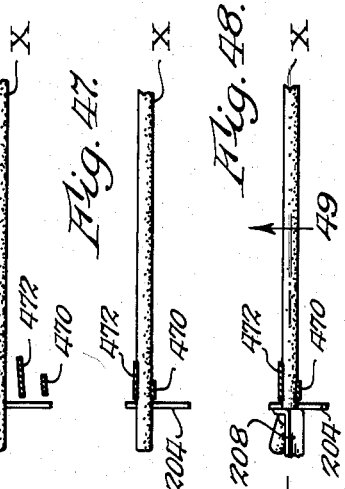
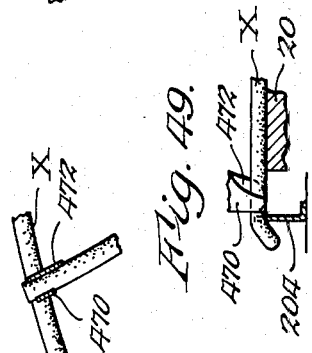
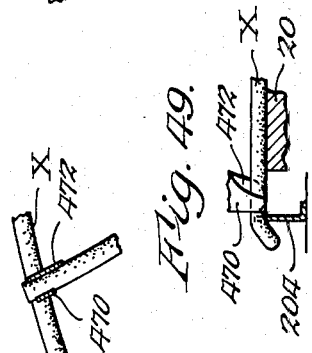
INVENTOR
HOWARD G. ALLEN
BY   OWEN M. HUDSON
George S Hastings
ATTORNEY Patented Feb. 24, 1953

2,629,340

UNITED STATES PATENT OFFICE 2,629,340

PRETZEL MACHINE

Howard G. Allen, Niagara Falls, and Owen M. Hudson, Kenmore, N. Y., assignors to American Machine & Foundry Company, a corporation of New Jersey Application December 29, 1945, Serial No. 638,230

12 Claims. (Cl. 107—8)

This invention relates to machines for making pretzels, more particularly to improvements in the pretzel forming or tying mechanism, the mechanism for delivering the pretzels from the tying mechanism, and the mechanism for delivering elongated dough sticks to the pretzel tying mechanism.

A principal object of the invention is to reduce the number of working parts in a machine of this character, as compared with prior machines of this type, to thereby facilitate and simplify the control of, and make more positive, the operations of the pretzel stick handling and pretzel forming mechanism.

A further object is to take advantage of its simplified construction and control to enable the machine to be operated at high speed without interference between moving parts and without distortion of the dough sticks during the formation of the pretzel. Moreover by reduction in the number of wearing parts misalignment and faulty operation is reduced to a minimum and a steady production of pretzels of high quality and uniform form is assured.

One of the main objects of the invention is to provide a machine with novel means to eliminate the breakage of the dough sticks which occurred with dry dough in pretzel making machines of the type having a horizontal support provided with stationary projecting elements, such as dome shaped members, or arcuate lips, about which the end portions of an elongated dough stick were looped and then twisted together before being tacked to the main portion of the stick. When a dough stick formed of very dry dough is looped about said elements or lips nicks are formed in it, as at the corners of the lips, and the stick tends to break at these nicks, since the stick is stretched during the formation of the loops and the twisting thereof together. Moreover, if the stick does not break, the sections of the dough stick extending form the projecting elements to the grippers which loop and twist the stick end portions together are excessively stretched and become much thinner than the main portion of the stick and are more fragile. The excessive stretching of the end portions of the stick results, because the portions of the dough stick extending along the lips or elements tend to stick to the same and hence are not stretched during the formation of the loops and the knot.

In our construction the ends of the dough sticks are looped about movable members such as rollers which are free to turn while the end portions of the stick are drawn about the same when the loops are formed and twisted together. Therefore, breakage of the dough sticks will be avoided. Moreover, the stretching of the loops caused during their formation and twisting will turn the movable members or rollers so that the sections of the stick which are behind as well as in front of the rollers will be elongated. Accordingly the stretching of the sticks may be distributed over longer sections thereof and the loops so formed will have a greater diameter and be less fragile.

If during the operation of the pretzel making machine, its normal operation is interfered with, as by mechanical failure, or loosening of a part, or by the accidental presence of a foreign body in the machine, any of which occurrences may act to cause overloading or strain, it is desirable to provide means to automatically stop the machine.

Another object of the invention, therefore, is to provide improved and simple mechanism to stop the pretzel tying mechanism and divert the dough sticks, which are delivered to the pretzel tying mechanism for formation into pretzels, in the event of such an overload. It has been found, for example, that when the pretzel making machine becomes worn the arms which carry the gripper fingers interfere with each other and thus cause breakage of various parts of the machine. More specifically, another object of the invention is the provision of means to take care of overloads, and for this purpose the pretzel tying mechanism is driven through an overload release clutch which will be disengaged to automatically stop the pretzel tying mechanism when overloading occurs and automatically operate a member adapted to deflect the dough sticks being delivered to the pretzel tying mechanism.

A further object of the invention is to provide improved mechanism for depositing the pretzels delivered from the pretzel tying mechanism in either a single or double row upon a traveling conveyor. To this end the pretzels are delivered from an upper grid upon which they are formed to a lower grid which is inverted to deposit the pretzels upon the traveling conveyor. For delivery of a double row of pretzels on the conveyor the lower grid moves from a pretzel receiving position underlying the upper grid to delivery positions at either side of the receiving position. The lower grid is inverted at its delivery positions and the pretzels drop on the conveyor to form two rows of pretzels thereon.

Since the lower grid starts turning while it is approaching the delivery positions, the throw of the pretzels will vary for various speeds at which the machine is operated. The differences in the throw of the pretzels so created are considerable. A further object is to compensate for this condition and maintain an equal spacing of the pretzel rows on the conveyor, by improved means for making the lower grid adjustable transversely relatively to its axis to increase or decrease its turning radius and thus control the throw of the pretzels.

Another object is to provide simplified mechanism to permit delivery of the pretzels in a single row whereby, without the addition of, or removal of parts, the mechanism for moving the lower grid to its delivery positions may be readily incapacitated in a few minutes, thus reducing shut down time of the machine to a minimum. Therefore the lower grid will not be displaced to its delivery positions and will remain in a position underlying the upper grid to deposit pretzels in a single row upon the conveyor.

Still another object of the invention is to reduce to a minimum the back lash of the mechanism driving the parts operating the grippers of the pretzel tying mechanism. With the constructions used on prior pretzel making machines, the back lash is sufficiently amplified after wearing of the machine to cause interference of the grippers of the pretzel tying mechanism.

Still another object of the invention is to provide the pretzel tying mechanism with an improved construction of the gripper fingers. Formerly the gripper fingers were shaped to straddle the underlying portions of the pretzel to which the loop ends were tacked in order not to indent said underlying pretzel portions. However, the former construction of the gripper fingers produced indentations of considerable size in the portions of the loop ends inside the portions tacked to the underlying pretzel portions, because the gripper fingers were in different relation to the loop ends when they moved them into tacking position. Moreover, when the machine was worn the gripper fingers would not straddle the underlying pretzel portions and would indent the same.

With our improved construction of the gripper fingers their tips overlie but do not descend into contact with the portions of the pretzel to which the loop ends are tacked, and therefore do not indent or mar such portions.

The lower grid to which the pretzel is delivered after it is formed on the upper grid, is provided with members which engage and thereby locate the loops of the pretzels dropped thereon in the desired position relative thereto. Due to different conditions such as the condition of the dough, variations in pretzel size and variations in the speed of delivery, variations in the position which the pretzel is delivered on the lower grid do occur. A still further object of the invention is to accommodate variations in the position of the pretzel on the lower grid. For this purpose conical members which engage the inner sides of the loops and are adjustable longitudinally and transversely of the grid are provided.

The lower grid is also provided with an impact member on which the knot portion of the pretzel is dropped which coacts with the conical members to locate the pretzels dropped on the lower grid and assist in retaining the intended shape of the pretzels. Still another object of the invention is to provide a novel construction of the impact member which in combination with the conical members will cause the pretzel to be squared up and spread into the proper shape. The impact element is provided with an abruptly inclined face on which the central portion of the pretzel between the tied ends comes to rest while the conical members form stops for the loops with which said members engage. Thus the pretzel is spread and squared up. Moreover the knot portion of the pretzel engages another inclined face of the impact element which assures the adhesion of the parts of the knot portion to each other.

Still another object of the invention is to permit adjustment of the impact element to compensate for adjustments of the lower grid which are needed to take care of differences in the throw of the pretzel.

Other objects of the invention are to provide readily demountable constructions of the pick-up bar and the star wheel; also to circulate a blast of air under the dough sticks in the same, to prevent sticking of the dough sticks to the pick-up bar and star wheel. By providing suitable openings in these members, so that a blast of air may be permitted to circulate under the bottom portions, that is, those portions of the dough stick which contact the pick-up bar or star wheel, it is thus possible to form a "skin" thereon which will prevent sticking of the dough sticks.

With these and other objects not specifically mentioned in view the invention consists of certain constructions and combinations which will be hereinafter fully described and claimed.

In the accompanying drawings which form a part of this specification and in which like characters of reference indicate the same or like parts:

Fig. 7 is a longitudinal sectional elevation on an enlarged scale of portions of the tying head, taken approximately on line 7—7 of Fig. 23;

Fig. 8 is a cross section of the lower grid pretzel transfer plate taken on line 8—8 of Fig. 37;

Fig. 9 is a fragmentary sectional elevation on line 9—9 of Fig. 7 of the tying head, showing the main operating cam, the pick-up bar, star wheel and operating connections therefor, the parts occupying an intermediate position in a cycle of operation;

Fig. 10 is a fragmentary vertical section on line 10—10 of Fig. 9;

Fig. 11 is a fragmentary vertical section, on line 11—11 of Fig. 9;

Figs. 12-14 are vertical sections, on lines 12—12, 13—13, and 14—14 respectively of Fig. 9, illustrating parts of the clutch drive for the main cam;

Fig. 15 is a sectional elevation, on line 15—15 of Fig. 9, showing the drive connections between the main cam and the pick-up bar, the star wheel, the pretzel forming plate and the transfer plate;

Fig. 16 is a sectional elevation of the clutch control means, on line 16—16 of Fig. 9;

Fig. 17 is a side elevation of the parts shown in Fig. 16;

Fig. 18 is a fragmentary cross section on line 18—18 of Fig. 15;

Fig. 19 is a vertical section of the tying head on line 19—19 of Fig. 9.

Fig. 20 is a sectional elevation of a clutch for effecting quarter turns of the star wheel;

Fig. 21 is a sectional elevation of a similar device for controlling half turns of certain parts of the tying head;

Fig. 22 is a sectional elevation of a yielding stop device for controlling the stop positions of the star wheel;

Fig. 23 is a fragmentary front elevation of the tying head, with portions in the rear thereof omitted for clarity;

Fig. 24 is a rear elevation of the upper portion of the tying head, taken approximately on line 24—24 of Fig. 7;

Fig. 25 is a cross section on line 25—25 of Fig. 24;

Fig. 26 is a similar view on line 26—26 of Fig. 24;

Fig. 27 is a plan view, partly in section, of the pretzel tying or forming plate and associated parts, the movable knife being omitted;

Fig. 28 is a similar view of the transfer plate and related parts;

Fig. 29 is a cross section, on an enlarged scale, on line 29—29 of Fig. 27;

Fig. 30 is a detail of means for stationarily securing the transfer plate of Fig. 28 in position for one row delivery of pretzels;

Fig. 31 is a transverse view of mechanism for cutting dough sticks, taken approximately on line 31—31 of Fig. 23;

Fig. 32 is a fragmentary bottom plan view of parts of the tying head, on line 32—32 of Fig. 23;

Fig. 33 is a fragmentary sectional elevation, taken approximately on line 33—33 of Fig. 32;

Fig. 34 is a perspective view of a portion of the knife actuating means shown in Fig. 31;

Fig. 35 is a sectional elevation thereof on line 35—35 of Fig. 31;

Fig. 36 is a development of the track for the operating cam for effecting two row delivery movements of the transfer plate;

Fig. 37 is an enlarged plan view of the transfer plate;

Fig. 38 is a vertical section thereof, on line 38—38 of Fig. 37;

Fig. 39 is a fragmentary vertical section thereof on line 39—39 of Fig. 37;

Figs. 40-42 are diagrammatic views illustrating the adjustability of the transfer plate to meet varying delivery requirements;

Fig. 43 is a reduced plan view of the delivery of two rows of pretzels upon a receiving element by the transfer plate;

Fig. 44 is a lengthwise section of one form of the pick-up bar, showing one of the dough stick receiving cavities, taken along 44—44 of Fig. 7;

Fig. 45 is a section thereof, on line 45—45 of Fig. 44;

Figs. 46-48 are fragmentary plan views illustrating the operation of one of the pairs of stick-lifting and carrying fingers in relation to the stick cutting means during a cycle of operation;

Fig. 49 is a section on line 49—49 of Fig. 48;

Fig. 50 is a fragmentary plan illustrating the fingers as applying an end portion of the stick to a loop of the pretzel;

Fig. 51 illustrates the same feature after the fingers have retracted from the pretzel; and Figs. 52-53 illustrate portions of a star wheel whose construction is different from that shown elsewhere in the drawings.

Figure 1:
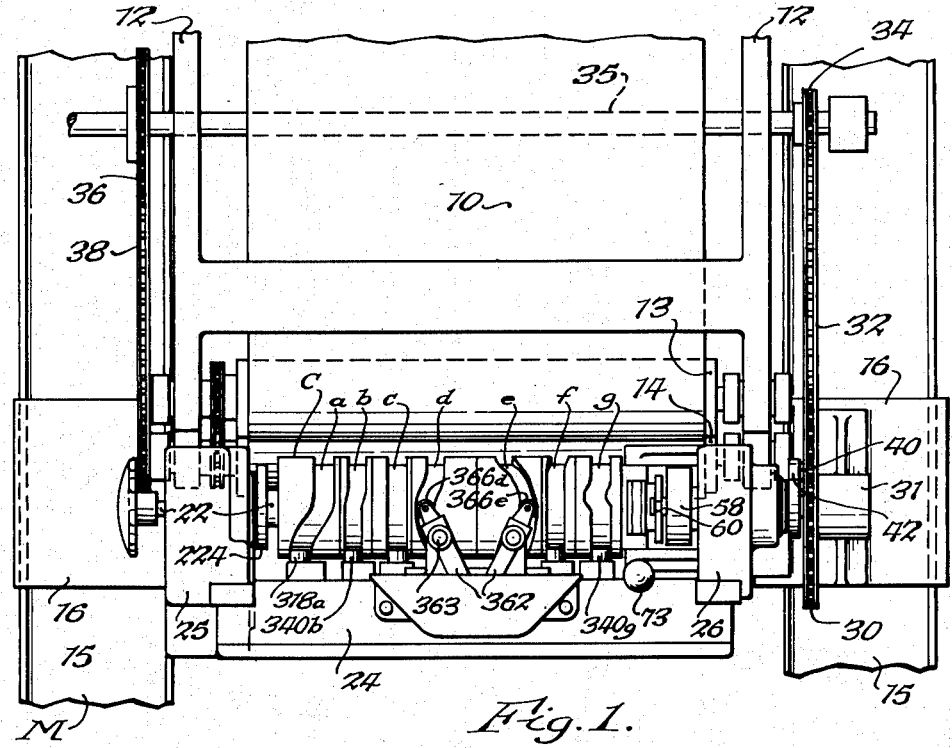
Fig. 1 is a fragmentary plan view of a portion of the machine, illustrating the tying head and related parts.

Gobs of dough are delivered from a measuring and cutting machine (not shown) which may be of the type illustrated in Weida Patent No. 2,342,093, between a pair of opposed endless belts 10 and 11 which shape the gob of dough into a long stick. The front or discharge end portions of the belts or aprons 10 and 11, which pass respectively over rolls 13 and 14, are shown in Figs. 1 and 7. Adjacent runs of aprons 10 and 11 are substantially parallel, the shaft of roll 13 and the other roll (not shown) supporting belt 10 are carried by a frame 12 which is adjusted by suitable mechanism such as shown in the Weida Patent No. 2,295,246 to vary the spacing between the adjacent runs of aprons 10 and 11 and thereby produce dough sticks X of the desired diameter. The shaft of roll 14 is suitably supported in a sub-frame (not shown) which is carried on the main frame M. Frame M includes a pair of horizontal side channels 15 extending longitudinally of the machine and each supporting a plate 16. A pair of plates 17 and 18 whose front ends are shown in Fig. 1 are supported from frame 12 and the frame supporting roll 14 to maintain the opposed runs of belts 10 and 11 in operative relationship. Since the construction of these plates 17 and 18 may be similar to that of the plates 128 and 129 shown in the above-mentioned Weida Patent No. 2,295,246, further description thereof is deemed unnecessary.

Each stick X, as it leaves the discharge end of apron 11, drops into a pocket or receiving portion of a rotatable transfer or pick-up bar P carried by the head. This bar, rotating a half revolution in each cycle of the machine, discharges the sticks upon a pivoted inclined plate or trap T, Fig. 7, over which the stick rolls into one of four radially disposed channels of a star wheel S.

A quarter turn of wheel S discharges each stick X in succession, so that it comes to rest in a substantially straight line on the rear portion of an upper or pretzel forming or tying grid G and upon portions of a relatively stationary table 20 with which the grid is associated. Tying devices operate upon the sticks to form them into pretzels on the grid G. From there the finished pretzels are discharged upon a lower transfer plate or grid L which, in turn drops them upon an endless belt conveyor or other suitable element B for removal of the pretzels from the machine and delivery to a bake oven. All of the foregoing mechanisms for receiving the sticks X, forming them into pretzels and delivering them as described, are actuated by mechanisms hereinafter described which are operated by a main cam member C (Figs. 1, 7 and 9) comprising a series of cam tracks or elements grouped together on a main cam shaft 22 rotatably mounted in the tying head H.

The head H (Fig. 23) is an upright frame-like structure including an upper hollow transverse horizontal cross piece 24, the opposite ends of which are bolted to the upper ends of left and right hand upright housings 25 and 26 which are supported upon the inner ends of plates 16. The stationary table 20, which was previously referred to, extends between and is rigidly secured to lugs on the inner sides of the housings 25 and 26, at a distance below the cross piece 24. A firm rigid tying head frame is thus provided.

The main cam shaft 22 is driven at a suitable speed for the cams to control actuation of the various mechanisms to effect their movement at the desired time in each cycle of operation. In the illustrated arrangement the cam shaft 22 is supported by housings or hollow uprights 25 and 26 and driven through the rotation of a sprocket wheel 30 (Figs. 1 and 9) whose hub is axially aligned with shaft 22 and supported in a bracket 31 extending upwardly from the main frame. Rotation of sprocket wheel 30 is effected by a sprocket chain 32 extending rearwardly (Fig. 1) and driven by a sprocket 34 fixed to a horizontal jack shaft 35 extending transversely underneath the upper run of belt 10. Shaft 35 is by suitable connections (not shown) operatively connected to a main shaft or other suitable source of power. Shaft 35 also carries a sprocket 36 driving a chain 38 having suitable connections (Fig. 1) for driving the rolls 13 and 14 of aprons 10 and 11.

The driving connection between shaft 22 and sprocket 30, see Figs. 9 and 10, comprises a stud 40 projecting sufficiently from the face of the sprocket to extend into the path of and engage with a finger or lug 42 extending radially from the outer end of a horizontal driving sleeve 44 which has an axial bore from which one end of shaft 22 protrudes.

The sleeve 44 has a reduced section journaled in a bearing 46 in the outer wall of housing 26 and at its inner end it carries a bearing 48 for rotatably supporting one end of the shaft 22. The opposite end of shaft 22 is mounted in a bearing 49 in the inner wall of housing 25, Fig. 9. A washer 50 secured by a clamp nut 51 to the right hand end of the shaft 22 revolves in a seat in the end of the driving sleeve 44 and serves to retain these parts in proper relation. The inner end of the sleeve 44 has an enlargement 52 from the transverse end face of which project a pair of diametrically opposite conical ended driving pins 56 which are fixed in the sleeve.

The rotation of sprocket 30 in the direction of the arrow, Fig. 7, will cause stud 40 to engage finger 42 and rotate driving sleeve 44. To effect rotation of shaft 22 there is keyed to shaft 22 adjacent the inner end of sleeve 44, a driven collar 58 which carries a pair of longitudinal pins 60 having conical heads which project sufficiently to be engaged by the pins 56 on sleeve 44. The pins 60 extend through bores 61 in collar 58 and are releasably maintained in operative position with their conical heads protruding from bores 61 by studs 62, Fig. 13, which are located in transverse holes in the collar and engage with beveled reduced diameter seats formed by circumferential grooves in the pins 60. The studs 62 are provided with axial bores in which springs 63 are mounted. The outer ends of springs 63 engage screws 64 threaded into the collar 58, so that the spring pressure can be adjusted by turning screws 64, and thus allow the pins 60 to remain in engagement with pins 56 under normal operating conditions.

It will be noted that one pair of pins 57, 60 is arranged closer to the shaft axis than the other pair of pins. This allows driving engagement of pins 56, 60 in only one position of the collar 58 with respect to the driving sleeve 44 while the latter is driven through its lug 42 from sprocket 30. This prevents operation of parts on the tying head from being effected while the collar 58 is a half turn out of line, or out of time. The foregoing arrangement will provide continuous rotation of cam C and shaft 22. Should an abnormal condition arise, such as jamming of driven parts or overload, pins 60 will be shifted endwise to the left against the holding action of studs 62, thus releasing the driving connection between pins 56 and 60. This will cause shaft 22 to come to rest even though sprocket 30 continues to rotate.

It is also necessary to provide some manually actuated means for such disengagement of pins 56, 60 which may comprise (see Figs. 9, 16 and 17), a shift collar 68 slidable and rotatable on shaft 22 at the left of driven sleeve 58. An annular groove 70 in this collar admits shift studs or rollers 71 of conventional construction carried by a yoke 72 which is provided with a hand lever 73. Yoke 72 is pivoted on a shaft 74 supported in the ends of arms 75 projecting from the adjacent upright 26. Shift collar 68 has a disk portion 78, Figs. 9 and 14, which engages a groove 79 in the adjacent end of each pin 60. The disk 78 is substantially circular, except for a straight or flat section 80 which is adapted to enter the groove 79 of the pin 60 which is nearest to the shaft axis. Under operating conditions there would be a tendency for this pin 60 to bind following any slight relative movement. This is overcome by a pair of pins 82, Figs. 13 and 14, which project from the end of sleeve 58 and bear on the flat section 80 at either side of pin 60 and act to take up thrust in either direction under driving conditions.

There is also provided a device for operatively connecting the deflector plate T to the shift lever 73 so that the plate T would be automatically shifted to divert sticks from the star wheel S in case something goes wrong, for example, if the gripper fingers should fail to seize the previously delivered sticks properly. For this purpose an arm 82 extending laterally from the hub of yoke 72 loosely receives in an aperture at its free end, the upper end of a link 84 (Figs. 16 and 17). The lower end of the link passes loosely through a hole in an arm 85 secured to one end of the hub of plate T which is pivotally supported from housings 25 and 26. A suitable nut or block 86 is threaded on link 84 below arm 85 and acts to engage and lift arm 85 when the lever 73 is either shifted to the left by hand or when sleeve 68 is displaced axially in the same direction by an overload.

A hand lever 88 extending forwardly and upwardly from the hub of arm 85 can be actuated independently of lever 73 to move plate T, when lever 73 is at its operative position (to the right in Fig. 9) without shifting the latter. If lever 73 is in its released position (to the left in Fig. 9) the plate T will be at inoperative position and manual displacement of lever 88 to return plate T to its operative position will also return lever 73, shift collar 68 and pins 60 to driving position, through link 84. Shifting lever 73 to the right under similar conditions merely causes link 84 to be lowered whence it would move through hole in arm 85 without shifting plate T. Lever 88, however, could then be moved to return plate T to operative position if desired.

Accordingly if lever 88 is manually displaced to the dotted position shown in Fig. 7 the dough sticks are diverted by plate T and delivered to a chute A down which they roll on to a conveyor C₁. The sticks thus diverted are returned by conveyor C₁ to a position at which they may be picked up and inserted in the dough measuring machine.

*Pick-up bar and star wheel*

This bar is generally of the same form shown in Weida Patent No. 2,295,246, and extends across the belts 10 and 11 and is provided with two deep pockets having arched or raised central portions shown in Fig. 44 to cause the center portion of the stick to be disposed ahead of its ends when it rolls out of the pocket. The mounting and operation of the pick-up bar is novel and is illustrated in Figs. 9 and 16. At each of its ends the bar has a transverse central groove 90 for the reception of a diametral tongue 92 which is releasably held in place by a set screw 93 passing through the bar and tongue. The right hand tongue 92 is secured to a split hub 94 which is secured on the inner end of a stub shaft 95 forming a pivot for one end of the pick-up bar. This pivot is rotatable in a bearing sleeve 96 mounted in the inner wall of upright 26, and the hub 94 can be turned or adjusted relatively to said pivot to position the bar in a predetermined position and the hub 94 then can be secured on said pivot by tightening screws 98. The left hand tongue 92 is fastened to the bar by a screw 93 and is secured to a hub 97 in which the pivot 99 for the other end of the pick-up bar is secured. The pivot 99 is journaled in a bearing 100 in the housing 25. Intermittent one-half revolutions of the pick-up bar P are produced in a manner which will now be described. A portion of the body 52 of drive sleeve 44 is turned down to an eccentric 100a, see Figs. 9 and 11, which is embraced by an eccentric strap 101. On strap 101 is an arm 102 extending downwardly within the interior of housing 26 and pivotally connected at its lower end to an arm 104 of a gear sector 105 pivoted on a stud 106 secured in the inner face of the inner wall of housing 26. This sector meshes with a gear pinion 108 turning on the bearing sleeve 96 of pivot 95.

The gear 108 is loosely mounted on sleeve 96 and carries a clutch device whose construction is shown in Fig. 21, for giving the pick-up bar its one-half revolution turns. This device includes a hub 110 fixed on shaft 95 and surrounded by a split cam sleeve consisting of two cam sections 110a which project from one end face of gear 108 and are eccentric to the axis of shaft 95. A pin 110b is mounted in aligned radial holes of hub 110 and shaft 95 and pressed by compression spring 110c against the inner face of one of the cam sections 110a. Thus, while the gear 108 rotates in one direction or the other upon oscillation of sector 105, the bar P will turn only in one direction as one or the other of the inner ends of the two cam sections 110a bears against the side of the spring pressed pin 110b while the gear 108 turns in a clockwise direction (Fig. 21). When gear 108 turns in the opposite direction the cam sections 110a slide over the end of the pin 110b and the pick-up bar remains stationary.

Locating means is provided at the other end of the pick-up bar to releasably hold the bar in each half turn position. A spring pressed detent or ball 111 (Fig. 19) is mounted in a socket 112a of a sleeve 112 which surrounds hub 97. Sleeve 112 is held against housing 25 by clamps 113 which are retained by screws 113a. The ball 111 may snap into one or the other of diametrically opposed recesses 114 in hub 97, see Fig. 9. Upon loosening clamp screws 113a (Fig. 19), the sleeve 112 can be turned to properly locate the stopping point of the pick-up bar. The detent for the star wheel S is shown on Fig. 9 directly below the pick-up bar locating means just described. It will be noted that all intermittently rotated parts, such as the pick-up bar, the star wheel and the upper and lower grids are provided with clutch devices for turning them a fraction of a rotation and detents or locating means for holding them stationary after they have been turned the required fractional turn. Fig. 22 shows in detail the quarter turn detent for the star wheel S, and the clutch for turning the same a quarter turn is shown in Fig. 20. The detent for star wheel S consists of a sleeve 116a surrounding a hub 116 fastened on shaft 118 journaled in housing 25. Sleeve 116a is clamped to housing 25 and provided with a socket 116b in which is mounted a spring pressed ball 116c adapted to engage one of four equally spaced recesses 116d in the hub 116. The construction of the clutch for turning shaft 118 will be hereinafter described.

Referring back to the mounting means for the pick-up bar, it will be noted that advantage may be taken of the arrangement shown to dismount the bar from the machine merely by loosening the two screws 93. This will allow the bar to be slid edgewise off the tongues 92. A somewhat similar mounting is used for the star wheel S, see Fig. 9. The opposite ends of the four radial arms 115 of the bar are received in crossed slots in hubs 116, 117 at left and right, respectively. Hub 116 is releasably held by the spring detent in any one of four positions, as previously explained. The other hub 117 is secured on a pivot shaft 120 turning in a bearing in the housing 26. This pivot 120 is releasably held in position by a split or spring ring 122, engaging in an annular groove in the pivot shaft and contacting a flange of the bearing in the housing. There is sufficient space from the ring 122 to the adjacent face of hub 117 so that upon removing ring 122 the pivot shaft 120 and the attached hub 117 can be shifted to the right to disengage it from the adjoining end of the star wheel S. The star wheel itself can now be shifted bodily to the right to detach it from the other hub 116 and by pulling it slightly out of line, it can be removed.

Mechanism for driving the star wheel S is best seen in Figs. 9, 15 and 18. This mechanism is arranged in the housing 25 and includes a cam disk 125 fastened to the end of cam shaft 22, and having a cam track 126 which engages a cam roller 128. This roller is pivoted on a cam lever 129 (not shown in Fig. 9) fulcrumed on a stud 130 carried by a bracket 131. The lower end of lever 129 is pivotally connected to one end of a transverse link 132 whose other end is pivoted at 134 to a gear sector 135. Sector 135 is mounted to oscillate on a bearing on a stud 136 secured in the wall of housing 25 (Fig. 18). Sector 135 meshes with and turns a gear 140 to and fro. Gear 140 is rotatable on pivot shaft 118 of the star wheel and it carries the clutch device shown in Fig. 20. This clutch includes a hub 142 clamped on shaft 118 and having a radial hole in which a spring pressed pin 142a is mounted to engage the inner face of the cam sections 143 which project from one end face of gear 140. The cam sections 143 are eccentric with respect to the axis of shaft 118, and when pin 142a engages the inner end of one cam section 143 while gear 140 turns in a clockwise direction (Fig. 20) the shaft 118 is turned a fourth of one revolution. When gear 140 turns in the opposite direction, shaft 118 remains stationary. The clutch is arranged with respect to gear 140 to shift star wheel in the proper direction and at correct time to deliver the sticks upon upper grid G as needed. The hub portion 142 is split so that it can be turned and clamped to pivot shaft 118 to cause the star wheel S to come to rest in correct positions.

As seen in Fig. 15, gear 140 meshes with an idler 144 pivoted on a plate 145 fixed in the interior of housing 25. This gear 144 meshes with a gear 146 which is provided with a clutch 147 similar to that shown in Fig. 21 and arranged on the shaft 148 of the upper grid G, to give the latter one-half revolution turns in a clockwise direction with a horizontal position of rest, shown in Fig. 27. Similar movements, alternating with those of grid G, are given to lower grid L by another idler gear 150 journaled on plate 145 and meshing with idler gear 144 and gear 152 which is provided with clutch device 153 similar to that shown in Fig. 21 to turn the shaft 154 by half revolutions and thereby operate the lower grid. Locating means for releasably retaining the lower grid L in its half revolution position is indicated generally at 155, Figs. 11 and 28. The construction of said means substantially duplicates the half turn control described for the pick-up bar P.

The lower grid L, as will hereinafter be explained, may operate about a fixed axis for delivering one row of pretzels, or it may be adjusted so as to be shiftable alternately from one to another of two positions to effect two row delivery of pretzels. For this purpose there is provided a grid shift barrel cam 156 (Fig. 28) which is clamped on shaft 158 journaled in housing 25 and driven from cam shaft 22. Shaft 22 has fixed thereon, adjacent cam disk 125, a sprocket wheel 160, Figs. 9 and 15. Sprocket 160 drives a chain 162 running over a sprocket gear 163, the hub of which is mounted on stub shaft 164 (Fig. 18) and has formed thereon a smaller sprocket 165. The latter through chain 166 drives another sprocket 168 which is fixed on shaft 158 of cam 156. The sprocket chain drive described is so designed that for each revolution of cam shaft 22 a half revolution of the lower cam shaft 158 is effected, thereby actuating cam 156 to shift the lower grid L from its receiving position for two row delivery which will be described later in detail. It should be noted that the cam 156 is not keyed on shaft 158 but is releasably clamped against a friction washer 238 interposed between one end of the cam and a collar 241 fixed on the shaft 158, by a lock nut 239 on the outer end of shaft 158. Index lines 240 on collar 241 and the cam body assist in positioning the cam properly when setting up the machine.

As shown in Figs. 15 and 18, take-up means are provided for the sprocket and chain drive. The stub shaft 164 for the combined sprockets 163 and 165 is mounted in a longitudinally adjustable yoke 170 whose opposite ends are slotted. The left hand slotted end of the yoke straddles the screw stud 136 which carries the sector 135 and is clamped thereon by nut 172. The other slotted end of the yoke is clamped by a screw 174 against an inner face of the housing 25. Thus the sprockets 163, 165 can be shifted to tighten chains 162, 166 relative to shafts 22 and 158 without disturbing other parts of the mechanism.

*Upper grid*

Grid G includes a relatively thin plate 180 (Figs. 23 and 27) having extensions 182 projecting forwardly and rearwardly at opposite sides of the axis of shaft 148. Parts 182 each have arcuate ledges 183, preferably adjustably mounted and extending in spaced relation to a fixed marginal projection 184 and providing a space to receive the central portions of the sticks. Adjustment of ledges 183 may be made to accommodate sticks of varying diameters. The opposed pairs of parts 183 and 184 are on opposite faces of plate 180 so as to be alternately placed in position to receive the sticks each time plate 180 makes its half turn. Plate 180 also has opposite lateral extensions 185 which extend axially thereof and are fixed to sleeves 186 on the inner ends of shafts 148 and 148a. Adjacent to these sleeves the shafts 148 and 148a are held in bearings 188 on the stationary table 20.

The table 20 includes front and rear parallel bars or portions 190, 192 respectively (Figs. 7 and 27) the opposite ends of which are connected to opposite lateral extensions 194 of the table. The bar 192 has a rear upstanding rib 196 provided on its inner face with a ledge 197 in which is formed a shallow trough 198 for receiving the dough stick. This ledge is cut away along its central portion to provide a space through which the adjacent parts 182 of the plate G may move. The space between the ledge 197 and the projections 184 on parts 182, which admits the central portions of the dough sticks, is aligned with the trough 198 when either of the parts 182 enters the space provided in ledge 197.

Rollers 200 which have grooved peripheries, are arranged in pairs at equal distances from and at opposite sides of the front to rear axis of the plate 180. The upper roller of each pair has its base aligned with the upper face of plate 180, each roller having an axial screw or pivot 200a passing through it into a wedge-shaped carrier or block 201 to support the rollers for free rotation on the flat, angularly related faces of those blocks (Fig. 29). Each block 201 is freely pivoted on a pin 201a located at the inner side of holes 202 in the plate 180, and one or the other of two spaced ledges on the ends of the blocks remote from the pins 201a rest on shoulders formed on plate 180 at the underlying side of the holes. In this position the rollers, which are at that time above the plate rest in a horizontal position as shown. The other or lower roller of each pair will then extend in angular relation to the top roller and to the plate at the under side thereof. It will be noted that the diameter of the rollers at the top portion of the rollers is less than the bottom diameter, thus giving assurance of free release of pretzels when the rollers are at the lower side of the plate as indicated in Fig. 29. A greatly improved result gained by the use of the freely rotatable rollers 200 is that the stick, as it is drawn around the rollers by mechanism hereinafter described in forming loops, is prevented from being excessively stretched or weakened; since tension or friction, such as occurred on the fixed cones of earlier constructions, is greatly reduced, so that the dough in these areas remains of uniform diameter, density and texture. It should be noted that while the ends of the stick are being looped around rollers 200 the midsection thereof is maintained in a predetermined position by the ledge 183.

After the stick has been deposited by the star wheel S on the ledges 197 of table 20 with its central portion on plate 180, it must be cut to the desired length before being engaged by the gripper fingers. For this purpose there is mounted at each end of table 20, beyond the ends of bar 192, a ledger plate or stationary knife 204 (Figs. 23, 27 and 31). Each knife 204 is formed of an angle bar whose horizontal flange is adjustably secured to the top face of table 20 to enable knife 204 to be adjusted with respect to a movable knife which is not shown in Fig. 27. The upright flange of each knife 204 is provided with an arcuate seat 205 (Fig. 31) in which rests the end of the dough stick protruding from trough 198. The relatively short end portions of the stick projecting beyond the seats 205 are unsupported so that they tend to bend downward slightly under their own weight. This causes the dough at the cutting edges of knives 204 to be somewhat under tension, and it is found that this causes a cleaner cut to be made without sticking of the severed end to the movable knife.

The movable knives 208 are right and left hand, and each is formed of a flat steel strip which is sharpened at one end and bent to extend parallel with the cutting flange of knife 204. Each knife 208 is adjustably fastened to the front face of a casting 210 (Figs. 23, 34 and 35). Each casting has spaced depending lugs 211 which straddle a plate 212 fixed to the top of table 20 and are pivotally mounted on a pin supported by plate 212. In end elevation, piece 210 resembles a bell-crank in one arm of which is located the pivot 214. At the other extremity of one of the pieces 210 is a lug 215 to which the lower end of an actuating arm 216 is pivotally connected (Figs. 31 and 35). This rod or arm 216 extends upwardly and rearwardly alongside of the inner face of housing 25 and is yieldingly mounted, as shown in Fig. 19, for endwise movement to rock casting 210 about pivot 214 and thereby obtain the cutting action of knife 208. For this purpose, the upper part of rod 216 passes through a sleeve 220 fixed to the inner side of housing 25. On the portion of rod 216 within sleeve 220 is secured a collar 221 which engages a coil spring 222 seated on the bottom of sleeve 220. Spring 222 thereby presses a roller 223 pivoted at the upper end of rod 216 against a cam 224, see Fig. 19. This cam is fixed to cam shaft 22 to turn therewith and has an abrupt step 225 operable to swing casting 210 suddenly about pivot 214 in a direction to carry knife 208 alongside knife 204 to sever the dough stick cleanly at the proper time. To effect simultaneous and like movement of both knives 208 the castings are connected by a link 230 to the upper ends of rocker arms 232 which are fixed at their lower ends to a rocker shaft 234 extending across the front of the tying head. The front bar 190 of table 20 is of inverted U-shape for receiving and forming a protective hood for rocker shaft 234 (Figs. 7 and 27).

When the upper grid G is inverted, after the ends of the pretzel stick have been looped and twisted together and tacked to the main portion of stick by mechanism hereinafter described, the pretzel so formed is deposited on the lower grid or pretzel transfer plate. During the inversion of grid G the blocks 201 will swing toward each other to assure the release of the pretzel from rollers 200.

*Lower grid*

One of the important features of the invention is that while the machine is intended to normally operate to deliver two rows of pretzels upon belt B or other receiving element, the machine may be converted to one row delivery in a few minutes without taking off or adding any mechanism or parts.

Since in Figs. 7, 28, 40, and 41 the machine is shown as set for two row delivery, this arrangement will be first described.

Grid L carries at opposite ends thereof trunnions 245 which are rotatable in bearings 246 in opposite lugs 247 (Fig. 7) extending downwardly from opposite side members 248 and 249 of a rectangular frame 250. This frame is mounted for forward movement, Fig. 28, in a horizontal plane. The left hand side member 248 of frame 250 has a channel 252 on its bottom which guides an adjustable slide or block 253. To the bottom face of the latter are pivotally connected by pins 254 the free ends of a pair of parallel levers 256. Levers 256 are fulcrumed on studs 257 which pass through a bottom plate 258 (Figs. 23 and 28) and through the hubs of the levers into bosses 259 depending from the adjacent end portion 194 of table 20 (Figs. 23 and 27). One of the levers 256 has an arm 260 extending from its hub to form a bell crank. Arm 260 carries a roller or cam follower 261 which engages in the cam track 262 of cam 156. A development of this track is shown in Fig. 36 and will be later described.

Extending between the left hand trunnion 245 of the grid L and the grid drive shaft 154 is a shaft section 264 which is connected to the same by universal joints. The right hand side member 249 of frame 250 has a lateral projection 265 provided with a stud carrying a roller 266. This roller serves to support the adjoining end of frame 250 by engagement between the lower face 268 of the table 20 and an opposed face 269 of a track bar 270 fastened to a transverse rib on said table 20 (Figs. 28 and 30).

The slide block 253 may be held in any selected relation to frame 250 to allow the frame to shift as a unit with the slide, by an adjusting screw 272 which is threaded into the front end of the block and supported by a split clamp block 274 carried on a clamp screw 275 threaded into the front end of the side member 248. The block 274 may be tightened to grip the screw 272 by rotation of the clamp screw 275. Upon loosening screw 275 the adjusting screw 272 may be turned to advance or retract the frame 250 relatively to the block 253. Since the block 253 always remains in the same relation to levers 256 during this adjustment, it is evident that manipulation of screw 272 will displace frame 250 and thus the grid L journaled thereon will also be shifted. In this way the longitudinal axis of the lower grid may be adjusted at various distances from a vertical plane through the axis of the upper grid shaft 148.

Referring to the development of cam 156 in Fig. 36, it will be seen there are two pretzel pickup positions 280 on cam track 262, one approximately on the center line and another 180° away. The grid G will deliver a twisted pretzel to grid L while the cam roller 261 is at each of the pick-up positions 280 of track 262. Between these pick-up positions there are two positions 281 and 282 on track 262 corresponding to the rear and forward positions of the grid L. The grid L is shown at its rear position in Fig. 28 and in full lines in Fig. 7. The forward position is represented in dotted lines in Fig. 7. Thus, the frame and grid will be shifted from its rear position (Fig. 28), when the cam roller 261 moves from position 281 in track 262 to the position 280, into its pick-up position where a pretzel will be dumped from grid G upon grid L. The latter will then move to its forward position when cam roller 261 reaches position 282, and upon making a half turn it drops the pretzel upon belt B. The frame and overturned grid will now return to pick-up position to receive another pretzel when cam roller 261 reaches the other point 280 of track 262, and will then proceed to the rear while the cam roller 261 moves to position 281 of track 262. At the rear position the grid L will again turn over and deposit another pretzel on the belt. Thus pretzels are arranged on conveyor B in the manner shown in Fig. 43 in two rows in staggered relationship.

Referring now to the specific construction of the lower grid (Figs. 37–39) it will be found that the trunnions 245 are secured to the opposite ends of a thin narrow supporting strip 285. On each face of this strip is adjustably mounted a grid section or plate member 286 whose exposed surfaces are recessed or channeled to afford minimum contact between the sections and the pretzels. On the longitudinal axis of strip 285, near each end, a screw stud 288 is secured to project from both sides through slots 289 extending fore and aft in the sections 286. Nuts on the studs 288 serve to clamp the sections 286 to the strip 285. Under normal conditions the two sections will register or be in alignment one over the other, as shown in Figs. 8 and 28. Rearwardly of the longitudinal axis of each section 286 and equidistant from the transverse axis there is mounted a pair of upwardly projecting cones or pegs 290. The cones are adjustably positioned on sections 286 so that the loops of the pretzels will drop down around the cones for locating the pretzel in desired relation to the grid.

Owing to different conditions of dough, pretzel size and speed of delivery, slight differences in the position of the pretzels on the grid do occur. In order to accommodate such variations, each cone 290 is secured to a section 286 by a screw 292 passing upwardly through a longitudinal slot 293 in the section into a threaded hole in the cone base, see Fig. 39. This hole is eccentric to the axis of the cone. By sliding the cones along slots 293 or turning them on their screws, or both, a very close adjustment of the cones on the sections for meeting any normal or usual requirements is thus available. In addition each grid section 286 has adjustably secured, centrally thereof, a block or projection 294 having intersecting inclined top faces 295 and 295a shown in Figs. 8 and 37. These elements act as impact members against or upon the upper face 295 of which the knot of a pretzel engages as it drops under the lower grid. It should be noted that the impact is sufficient to effect good adhesion of the knot portions. Moreover the top face section 295a of block 294 (Fig. 8), which has a steep inclination, engages the portion of the pretzel intermediate the sections of the pretzel to which the pretzel ends are tacked. Since the cones 290 engage the inner sides of the loop portions of the pretzel, it will be induced to square up and spread into proper shape as the portion of the pretzel overlying face 295a tends to slide down face 295a.

Each part 294 is mounted for fore and aft adjustments, having a longitudinal channel fitting over a guide rib 296 on the grid section to which it is secured. A screw 297 is threaded in each block 294 and engages a groove in the guide rib to secure the block in the adjusted position. It is intended that the cones 290 and blocks 294 should act to minimize contact of pretzels with the grid plates or sections. Thus the loops should fall around and rest on the conical faces of cones 290, rather than slide down these cones to their bases, while the knot portion of the pretzel rests on face 295. In the foregoing description it has been assumed that the grid sections 286 are mounted directly over or in register with each other along their front and rear edges. However, upon releasing the nuts on the screw studs 288, these plate sections can be shifted to various extents and arrangements within the limits of slots 289. The full use of these adjustments will be described later.

For two row delivery of the pretzels the lower end of a screw 300 (Figs. 23 and 30), which is threaded in a hole in the right hand extension 194 of the table 20 and is locked by a nut 302, is out of contact with extension 265 of lower grid L so that the latter can freely oscillate. When change to one row delivery is desired, the nut 239 which holds the cam 156 on its shaft is loosened and the frame 250 is shifted to bring grid L to its central or pretzel receiving position with respect to grid G. Frame 250 is then locked in its adjusted position by loosening nut 302 and turning screw 300 down to bear firmly on the extension 265 of frame 250 and then tightening nut 302. Thus, while the driving mechanism for the cam 156 continues to operate, its action will have no effect on the loosened cam 156. Grid L will therefore remain stationary and turn about a stationary axis receiving the pretzels from grid G and delivering them all in the same path on the belt B below. It should be clear that when grid L and frame 250 are thus shifted from the rear position shown in Fig. 28 to the central or pickup position, the parallel levers 256 and link 264 will swing to right about their pivots. Thus the extension 265 of frame 250 will enter the track formed between members 268 and 269 and come to rest under the screw 300 at the position shown in dotted lines in Fig. 28 and in full lines in Fig. 30. When returning to two-row delivery, the screw 300 is disengaged from extension 265 and locked in its freed position. The cam 156 is reset in correct position by registering the index lines 240 as previously stated.

The construction and operating connections of the lower grid L now having been described in general, a more specific and detailed explanation of the advantages gained by this arrangement will follow, reference being directed particularly to Fig. 37 and Figs. 40–42. Assuming that a normal or medium speed of production of pretzels on this machine may be, say fifty per minute, the distance E in Fig. 40 may represent the offset of the longitudinal axis 289a of the lower grid with respect to the longitudinal axis 148a of the upper grid G to enable the pretzels to be properly received on grid L from grid G. It will be observed that when the upper grid G revolves the pretzel will be dropped through an arcuate path on lower grid L. Now if the delivery speed is reduced to, say forty per minute, the distance E must be reduced somewhat, since at that slower speed the pretzel path from grid G to grid L will be less arcuate. In other words the trajectory will be flatter. This is, of course, due to the fact that the machine setting will cause a slower rotation of grid G. If, however, it is desired to increase delivery to a maximum speed of, say sixty per minute, distance E must be increased correspondingly. Under any of the above conditions or any intermediate adjustments, the pretzels will fall well within the edges of belt B when the machine is set for one row delivery. The foregoing changes in the position of the axis 280a with respect to axis 148a are made by adjustment of the frame 250 relatively to the block 253, as previously explained.

Due to the limitations resulting from the short time available in a single cycle of the machine it is impossible to effect rotation of the lower grid during two row operation while its axis is stationary at either end of its travel. Consequently the rotation of grid L commences before it has reached its front and rear positions. Thus its movement to these positions is a simultaneous traveling and rotation of the grid near the ends of its movements to these positions. Added to this is the fact that, as shown in Fig. 41, there is a difference in the throw of the pretzel at the front position relatively to that when thrown from the rear position. This is represented by the distances H and K respectively from the axis 280a to the center of the pretzel deposited on belt B, and is due to the fact that rotation of the grid L in the rear position is in an opposite direction to the direction of travel of grid L to the rear. H is therefore shorter than K, where the rotation of grid L is in the same direction as the direction of travel, resulting in a relatively greater speed of deposit of the pretzel and consequently the pretzel travels in a greater arc while being deposited at that point. The cumulative results of these conditions gives wide variations at different speeds in the positions where pretzels are delivered in two rows on belt B. The dimension line R (Figs. 41 and 42) represents the distance between the outer edges of the pretzels in the two rows. Under some conditions the pretzels will not fall in desired positions between the edges of the belt and may even project beyond the belt at one side or the other.

To compensate for such conditions, especially where the belt location is fixed, the proper axial offset is obtained according to delivery speed, when the grid plates 286 are shifted relatively to strip 285 upon unloosening the bolts 288 passing through the slots 289 of the plates (Figs. 37, 41 and 42). This, in effect, gives a re-location of the axis 280a of grid L with respect to the grid itself. Shifting plates 286 to one side as shown in Fig. 41 will correct the trouble and give desired spacing R of the pretzels at low speeds, while shifting the plates 286 in the opposite direction (Fig. 42) will give the desired result at high speeds. In the first instance the turning radius of the cones 290 about the longitudinal axis of the lower grid is increased, while in the second case the turning radius of these cones about the same axis is decreased, both relatively to a normal radius with the two plates 286 in register. Thus proper placing of two rows of pretzels on belt B in the same location may be had at any speed within machine range. In each case the pretzels dropped from the grid G on grid L will be supported by block 295 and cones 290 of the latter in positions wherein their turning radius will be increased or decreased depending upon the adjustment of plates 286. Such adjustments also help to compensate for variations in dough mixtures of varying consistency, humidity, temperature changes and other factors, including variable degree of dough adhesion to the plates 286. It will be noted that when the plates 286 are adjusted that the cones 290 should be adjusted in the slots 293 and also about the eccentric screws until they are found to be in the proper positions to support the pretzels. The same is true of the blocks 294 which should be similarly adjusted.

*Pretzel tying devices*

For convenience, I have designated the seven cam tracks on main cam C (Fig. 1) as $a$, $b$, $c$, $d$, $e$, $f$ and $g$, reading from left to right. Fig. 24 shows a rear elevation of the hollow cross piece 24, and here will be found seven cam followers or rollers which engage in the corresponding tracks. Cam rollers 312c and 312f engage tracks $c$ and $f$ of cam C and are mounted on bell crank levers 312 pivoted on studs 313 secured in member 24 and engaging rollers 314 on the stems 315 of the tampers 316 slidably mounted in guides 317 secured on member 24, to shift them up and down. The construction of the tampers 315 hereof is similar to that of the tampers 315 of Weida Patent No. 2,295,246 and they are similarly operated to press the ends of the pretzel against the main portion of the pretzel after said ends have been looped over one another in a manner hereinafter described. Cam follower 318a, Figs. 23 and 24, engages track $a$ of cam C and is supported at the free end of a lever 318 fulcrumed on a stub shaft 319 (Fig. 26) supported by a bracket 320 and the rear wall of member 24. Fixed on shaft 319 is another arm 322 at the free end of which is pivoted a roller 324 engaging a transverse slot of a piece 325 carried at one end of a horizontal rack-bar 326 (Figs. 23 and 32). Piece 325 is fastened on bar 326 by an eccentric stud 328 (Fig. 32). Only one rack-bar is used instead of two as in former constructions. The rack-bar 326 is supported in guides 329 arranged within the interior of member 24 and serves to rotate the gear casings 330 about the axes of shafts 332. For this purpose shafts 332 are arranged in sleeves 333 which are rotatably and slidably mounted in member 24 and one gear segment 334 meshes directly with the rack bar 326 while the other gear segment 334 meshes with an idler gear 335 engaging rack teeth on an offset portion of the rack bar. Gear segments 334 are fastened to sleeves 333. This produces the desired opposite rotation of sleeves 333 together with the casings 330 which are keyed thereon, see Fig. 33.

The upper ends of sleeves 333 have collars 336 fixed thereon. Collars 336 are provided with circumferential grooves which engage rollers on levers 337 fulcrumed on shafts 338 supported in member 24. Shafts 338 carry arms 340 which carry cam rollers 340b and 340g engaging tracks $b$ and $g$ of cam C. The shape of tracks $b$ and $g$ of cam C is similar to that of cam tracks 335 and 365 of cam drum 330 of the above mentioned Weida Patent No. 2,295,246 in order to raise and lower the gripper fingers 356 and 359 which are supported from the casings 330 in a manner which will now be described. The shafts 332 have gears 342 secured on their lower ends and meshing with intermediate gears 343 mounted on stub shafts 344 journaled in casings 330. Gears 343 mesh with gears 345 fixed on shafts 347 supported in casings 330. Since these gears are confined between the top and bottom walls of gear casings 330, the casings 330 will be moved up and down with shafts 333.

Blocks 349 are fastened on the lower ends of shafts 347 and carry right and left hand arms 350 and 351 respectively on which are supported the right and left hand grippers 353 and 354. Each gripper 353 and 354 consists of fingers 356 and 359. Fingers 356 are rigidly connected to the arms 350 and 351 respectively. Each of the fingers 356 is provided with a vertical rib 356a and a lug 356b (Fig. 23). A pin 358 is supported in each rib 356a and lug 356b. Each finger 359 (Fig. 7) has formed on its inner face a vertical rib 359a (Fig. 7) which is pivotally mounted on pin 358 adjacent the inner face of rib 356a. A compression spring 361 is interposed between the upper ends of fingers 356 and 359 and serves to force the lower ends thereof together. A latch 363 is pivoted on a pin 362 which is supported by a lug 359b of finger 359 (Fig. 23) and the rib 359a thereof. Latch 363 has a shoulder engaging an abutment on finger 356 and serves to hold fingers 356 and 359 spread apart until the grippers in their downward movement reach the point at which they are ready to seize the dough stick. At this point the end of each latch 363, which projects through an opening in the corresponding finger 356, will strike the star wheel S and thereby be raised sufficiently to permit the movable fingers 359 to close on the ends of the dough stick.

The grippers are thus actuated to seize the portions of the dough stick ends extending between the trough 198 and the ledger plates 204 (Figs. 23 and 27). The extreme ends of the dough stick projecting beyond the ledger plates 204 are severed by the knives 208 and the portions of the dough stick seized by the grippers are raised when the sleeves 332 are moved upwardly. While the gear casings 330 are thus moved upwardly by the upward movement of sleeves 333, and also rotated through the gear segments 334 fastened on sleeves 333, the shafts 332 are rotated to cause the shafts 347 to turn and thereby move the grippers in different paths which are fully described in the Curtis Patent No. 2,107,749 and Weida Patent No. 2,295,246. Thus the right hand end of the dough stick is moved in a predetermined path to complete a loop and the left hand end of the stick is drawn through the first loop. At the end of each loop forming operation the ends of the dough stick are tacked to the main portion of the pretzel by the tampers 316 which pass down between the gripper fingers 356 and 359 and engage and force open the movable finger 359 to release the gripped pretzel ends. Since the construction of the mechanism for operating the tampers is similar to corresponding mechanism shown in Weida Patent No. 2,295,246, further description thereof is deemed unnecessary.

To rotate shafts 332 relatively to sleeve 333 to swing arms 350 and 351 relatively to casings 330, the upper ends of shafts 332 have pinions 460 fixed thereto. These pinions 460 are driven by gear sectors 462 (Figs. 23–25). Sectors 462 are fixed to shafts 463 journaled in brackets 364 fastened on the top of member 24. On the lower ends of shafts 463 are fastened cam levers 366 which carry cam rollers 366d and 366e engaging tracks d and e of main cam C. The pinions 460 are long enough to remain in mesh with the segments 362 during the up and down movement of shafts 332.

In the prior gripper constructions, as in Weida Patent No. 2,295,246, either one or both of the gripper fingers were bifurcated so that they could straddle the underlying stick portion when attaching the loop ends. Therefore when the tamper feet descended to press the loop ends against the portions of the dough stick to which said ends are tacked, the pressure so applied caused the sides of the loop ends to protrude from under the portions of the gripper fingers straddling the dough stick. This pressure also flattened and distended the portions of the dough stick underlying the loop ends against the portions of the bifurcated grippers disposed at either side thereof and thereby formed indentations in said underlying portions of the dough stick. Moreover with the gripper construction of Weida Patent No. 2,295,246, a tail portion about ¼" long projects beyond the tacked portions of the loop ends, and may burn or become too crisp in baking.

In the present arrangement neither finger of each pair of grippers is bifurcated, but the tips of fingers 356 have broad and flat ends 472, so that there is no opening into which the loop ends may protrude when pressed by the tamper feet. The narrow tip 470 of finger 359 is so formed chiefly to clear parts of table 20. When applying the ends of the loops upon the main portion of the pretzel, the tips 470 and 472 do not descend far enough to touch the main portion of the pretzel and thus cannot indent the same. Since the tips 470 and 472 can seize the portions close to the loop ends, a very short tail is formed which does not project enough to burn in baking.

Fig. 46 shows the tips 470 and 472 of fingers 359 and 356 approaching the position shown in Figs. 47–49 wherein the ends of the dough stick are seized while their surplus portions are being severed. Fig. 50 shows tips 470 and 472 in the position wherein they apply the loop ends to the main portion of the pretzel. Fig. 51 illustrates the appearance of the loop end after it has been tacked or tamped against the main portion of the pretzel by the tampers 315. It may be noted that the tampers in passing downwardly between the fingers 356 and 359 engage the inclined portion of finger 359 and move it away from finger 356.

Due to tackiness of the dough under certain conditions, the sticks tend to adhere more or less to the pick-up bar and to the star wheel. It has been customary to direct an air blast at the machine while it is running, preferably from the front, to assist in starting the curing of the exterior faces of the dough sticks as they are delivered to and are formed into pretzels on the grids. In the form of pick-up bar P illustrated in Figs. 44 and 45 passages 480 are formed at intervals in the bar through which air directed at the machine can be circulated under the bottom of the sticks. Thus air circulating through the ducts 480 can travel laterally each way to some extent after passing through the inner ends of the ducts. The ducts 480 can be formed only in the central section of the bar if desired. In the star wheel S shown in Figs. 7 and 9, holes 484, which may be about ⅛" diameter and 1" apart, are drilled through the webs, as shown, to direct air to the bottom of the sticks.

A modification is shown (Fig. 52) in which the star wheel could be made of four separate radial pieces 490 secured together at intervals to spaced pieces 492 forming a shaft or axial section. This would provide elongated air passages 494 between the ends of the pieces 492 through which air could be circulated. In another modification the radial arms of the star wheel are formed of sections 496 of perforated sheet metal which are cut, as shown in Fig. 53, to leave straight inner and outer edges and are suitably secured together by soldering or otherwise. The perforations 498, particularly those adjacent the joints, will act to direct air to the stick surfaces.

Figure 2:
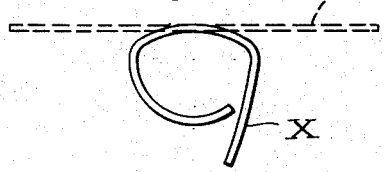
Figs. 2-6 are views illustrating the succession of steps in forming a stick of dough into a pretzel.
Figure 5:
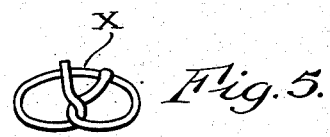
Figure 3:
Figure 6:
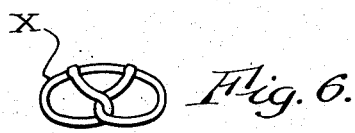
Figure 4:
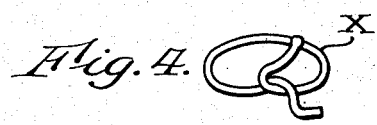

In the operation of our improved machine the dough stick X (Fig. 2) delivered from the belts 10 and 11 is delivered to the pick-up bar P which transfers it across plate T to the star wheel S. The upper grid G receives the dough stick from the star wheel S, and the gripper mechanism is operated to cross the ends of the dough stick, as shown in Figs. 2 and 3, and deposit the end portion of the right hand loop on the intermediate portion of stick X while the left hand loop end is drawn through the right hand loop and deposited on the intermediate portion of stick X. When the ends of the loops are tacked to the underlying portion of the stick X, as shown in Fig. 6, a pretzel is formed.

Although we have described our invention in detail and therefore utilized certain specific terms and language herein, it is to be understood that the present disclosure is illustrative, rather than restrictive, and that changes and modifications may be resorted to without departing from the spirit or the scope of the claims appended hereto.

What is claimed is:

1. In a pretzel forming machine, the combination with pretzel forming means, of a grid positioned to receive a pretzel from said forming means, said grid being rotatable about a horizontal axis and arranged to support a pretzel dropped upon its upper face from said means while the grid is in a horizontal position, of a plurality of conical members on the upper face of said grid disposed within the interior of the pretzel deposited upon the grid to support portions of the pretzel out of contact with the upper face of the grid.

2. In a pretzel forming machine, the combination with pretzel forming means, of a grid positioned to receive a pretzel from said forming means, said grid being rotatable about a horizontal axis and arranged to support a pretzel dropped upon its upper face from said means while the grid is in a horizontal position, of a plurality of conical members on the upper face of said grid disposed within the interior of the pretzel deposited upon the grid to support portions of the pretzel out of contact with the upper face of the grid, said members being adjustable longitudinally and transversely of the grid to accommodate different positions or sizes of the pretzel deposited on the grid.

3. In a pretzel forming machine, the combination with pretzel forming means, of a support positioned to receive a pretzel dropped from said forming means, said support being rotatable about a horizontal axis and arranged to support a pretzel upon its upper face while the support is in a horizontal position, of a member extending upwardly from the upper face of said support and arranged to impact the knot of a pretzel dropped upon the support and thus assure good adhesion of the knot portion of the pretzel deposited on the support, said member being adjustable transversely of said support.

4. In a pretzel forming machine, the combination with a horizontal support located beneath said upper support, said support being rotatable about a horizontal axis and adapted to support a pretzel on its upper face, means for moving said support transversely to a position to receive a pretzel and then alternately moving the support transversely to delivery positions at either side of the pretzel receiving position after the lower support dwells at pretzel receiving position, and mechanism for turning the support upon its horizontal axis while it is at each of said delivery positions to cause the pretzels to be deposited in two rows on a traveling conveyor, said mechanism operating to turn the support in the same direction while it is approaching the delivery positions, to deliver the pretzel on the conveyor, said support being adjustable transversely relative to its axis of rotation to compensate for the difference in the arcuate paths through which the pretzels are thrown when the support is turned while approaching the delivery positions and thus permit the pretzels to be deposited in predetermined positions in two rows on the conveyor.

5. In a pretzel forming machine, the combination with a frame, of a grid having trunnions mounted in said frame and rotatable about a horizontal axis and adapted to support a pretzel on its upper face, a block slidably connected to one end of said frame and extending transversely thereof, an adjusting screw threaded into one end of said block and rotatably mounted in said frame, a pair of parallel levers connected to said block, members supporting the other end of said frame, a cam follower connected to one of said levers, a cam engaging said cam follower and operating to move said frame and grid transversely to pretzel receiving and pretzel delivering positions whereby said grid will be displaced transversely relative to said block upon turning said adjusting screw, a rotary shaft, a universal joint connected to one end of said shaft, a link connected to said universal joint, and a universal joint connecting the other end of said link to one of the trunnions of said grid to turn and invert said grid when it reaches a pretzel delivery position.

6. In a pretzel forming machine, the combination with an upper support rotatable about a stationary horizontal axis and adapted to support a pretzel on its upper face while in a horizontal position, of a lower support underlying said upper support, said lower support being rotatable about a stationary horizontal axis which is offset from the axis about which the upper support turns and adapted to support a pretzel on its upper face while in horizontal position, mechanism for turning said upper support about its horizontal axis to transfer a pretzel from the upper support to the lower support, a device for displacing the axis about which said lower support turns horizontally relative to said upper support to cause the pretzels transferred to the lower support to be deposited at the same predetermined position on the lower support at various speeds of rotation of said upper support and means for turning the lower support about its stationary horizontal axis in the various adjusted positions thereof to deliver pretzels from the lower support.

7. In a pretzel forming machine, the combination with a frame, of a horizontal grid rotatably mounted in said frame and adapted to support a pretzel on its upper face, a block slidably connected to one end of said frame and extending transversely thereof, an adjusting screw threaded into one end of said block and rotatably mounted in said frame, a lever connected to said block, members supporting the other end of said frame, a cam follower connected to said lever, a cam engaging said cam follower and operating to move said frame and grid transversely to pretzel receiving and pretzel delivering positions whereby said frame and grid will be displaced transversely relative to said block upon turning said adjusting screw to vary the pretzel receiving position of said grid, and means for inverting said grid when it reaches a pretzel delivery position.

8. In a pretzel forming machine, the combination with a horizontal support adapted to receive and support pretzels on its upper face, means for moving said support transversely from pretzel-receiving position to pretzel-delivery positions at either side of the pretzel-receiving positions and mechanism for turning said support while it approaches the delivery positions to deliver the pretzels from the support in two rows on a conveyor, said support being adjustable transversely relative to its axis of rotation to compensate for the difference in the arcuate paths through which the pretzel is thrown at said delivery positions and thus permit the pretzels to be deposited in predetermined positions in two rows on the conveyor.

9. In a pretzel forming machine, the combination with a frame, of a horizontal support rotatably mounted on said frame and adapted to support a pretzel on its upper face, a lever connected to said frame, a cam follower connected to said lever, a rotating cam shaft, a cam releasably secured to said shaft and engaging said follower and operating to displace said frame with the support transversely whereby the support is moved from a pretzel-receiving position to a pretzel-delivery position, and a device for inverting the support at the pretzel-delivery position to cause the pretzel to drop off the support, whereby upon releasing said cam from said shaft the support will remain at pretzel-receiving position to deliver the pretzel from the support at its pretzel-receiving position.

10. In a pretzel forming machine, the combination with pretzel forming means, of a support having a horizontal upper face adapted to support a pretzel dropped thereon from said means, of a plurality of spaced members on the upper face of said support adapted to engage the inner sides of the loop portions of said pretzel and the portion thereof between the ends of the pretzel to square the pretzel and spread it into proper shape, and an element on the upper face of said support to underlie and impact the knot portion of the pretzel to promote adhesion of the parts of the knot portion.

11. In a pretzel forming machine, the combination with pretzel forming means, of a support having a horizontal upper face adapted to support a pretzel dropped thereon from said means, of a plurality of spaced members on the upper face of said support adapted to engage the inner sides of the loop portions of said pretzel and the portion thereof between the ends of the pretzel to square the pretzel and spread it into proper shape, the member engaging the portion of the pretzel between the ends thereof being provided with an element arranged to underlie and impact the knot portion of the pretzel to promote the adhesion of the parts thereof, said member being adjustable with said element transversely of said support.

12. In a pretzel forming machine, the combination with mechanism for forming a pretzel from an elongated dough stick, of means for delivering the pretzels formed by said mechanism in either a single row or two rows on a travelling conveyor, said means including a single support and a member mounting said support for rotation about a horizontal axis so said support may rotate from a horizontal position from which it receives the pretzels to an inverted position whereby the pretzels are deposited upon the conveyor in a single row, a device supporting said member, and means for actuating said device selectively to bodily move said member alternately to either side of said pretzel receiving position whereby the pretzels will be deposited in two rows on the conveyor when the support is inverted.

HOWARD G. ALLEN.
OWEN M. HUDSON.

REFERENCES CITED

The following references are of record in the file of this patent:

UNITED STATES PATENTS

| Number | Name | Date |
|---|---|---|
| 465,382 | Marks | Dec. 15, 1891 |
| 2,107,749 | Curtis | Feb. 8, 1938 |
| 2,161,267 | Young et al. | June 6, 1939 |
| 2,245,284 | Lockwood | June 10, 1941 |
| 2,295,246 | Weida | Sept. 8, 1942 |
| 2,474,337 | Sutherland | June 28, 1949 |